US005972079A

United States Patent [19]
Foley et al.

[11] Patent Number: 5,972,079
[45] Date of Patent: Oct. 26, 1999

[54] SUPPORTED CARBOGENIC MOLECULAR SIEVE MEMBRANE AND METHOD OF PRODUCING THE SAME

[75] Inventors: Henry C. Foley; Madhav Acharya, both of Newark, Del.; Brenda A. Raich, Seabrook, Tex.

[73] Assignee: University of Delaware, Newark, Del.

[21] Appl. No.: 08/671,698

[22] Filed: Jun. 28, 1996

[51] Int. Cl.[6] .......................... B01D 69/12; B01D 71/02
[52] U.S. Cl. ...................................... 96/11; 95/54; 55/524
[58] Field of Search ................................. 95/54; 96/4.11; 55/524

[56] References Cited

U.S. PATENT DOCUMENTS

| | | | |
|---|---|---|---|
| 3,604,246 | 9/1971 | Toren ........................................ | 96/4 X |
| 4,888,114 | 12/1989 | Gaddis et al. ......................... | 55/524 X |
| 5,069,794 | 12/1991 | Haag et al. ............................ | 95/54 X |
| 5,104,425 | 4/1992 | Rao et al. ............................... | 96/11 X |
| 5,108,465 | 4/1992 | Bauer et al. ............................. | 95/54 |
| 5,127,925 | 7/1992 | Kulprathipanja et al. ................ | 95/54 |
| 5,160,713 | 11/1992 | Mazanec et al. ...................... | 95/54 X |
| 5,240,480 | 8/1993 | Thorogood et al. ................... | 95/54 X |
| 5,261,948 | 11/1993 | Foley et al. ........................... | 95/903 X |
| 5,271,842 | 12/1993 | Degen et al. ........................... | 96/4 X |
| 5,342,431 | 8/1994 | Anderson et al. ..................... | 96/4 X |
| 5,350,443 | 9/1994 | von Blücher et al. ................ | 55/524 X |
| 5,429,743 | 7/1995 | Geus et al. ............................. | 96/11 X |
| 5,431,864 | 7/1995 | Rao et al. ............................... | 96/11 X |
| 5,447,557 | 9/1995 | Golden et al. ......................... | 95/903 X |
| 5,536,302 | 7/1996 | Golden et al. ......................... | 55/524 X |

FOREIGN PATENT DOCUMENTS

| | | | |
|---|---|---|---|
| 0102902 | 3/1984 | European Pat. Off. ..................... | 96/4 |
| 0575945 | 12/1993 | European Pat. Off. ..................... | 96/11 |
| 59-043889 | 3/1984 | Japan ........................................ | 96/4 |
| 60-129119 | 7/1985 | Japan ........................................ | 96/11 |

OTHER PUBLICATIONS

Foley, H.C., Carbogenic Molecular Sieves: Synthesis, Properties and Applications; Microporous Materials 4; 1995; pp. 407–433.

Koresh, J.E. and A. Soffer, Molecular Sieve Carbon Permselective Membrane Part I. Presentation of a New Device for Gas Mixture Separation; Separation Science and Technology, 18(8); pp. 723–734; 1983.

A.J. Bird and D.L. Trimm, Carbon Molecular Sieves Used in Gas Separation Membranes; Carbon; vol. 21; No. 3; pp. 177–180, 1983.

M.B. Rao and S. Sircar, Nanoporous Carbon Membranes for Separation of Gas Mixtures by Selective Surface Flow; Journal of Membrane Science, 85; pp. 253–264 (1993).

Y.D. Chen and R.T. Yang, Preparation of Carbon Molecular Sieve Membrane and Diffusion of Binary Mixtures in the Membrane; Industrial and Engineering Chemistry Research, 33; pp. 3146–3153 (1994).

R.K. Mariwala and H.C. Foley, Evolution of Ultramicroporous Adsorptive Structure in Poly(furfuyl alcohol)–Derived Carbogenic Molecular Sieves; Industrial and Engineering Chemistry Research, 33; pp. 607–615 (1994).

Knudsen, M. The laws of molecular flow and of inner friction flow of gases through tubes, Journal of Membrane Science 100, 23–25 (1995).

R.J.R. Uhlhorn et al., New Ceramic Membrane Materials for Use in Gas Separation Applications; Science of Ceramics 14; pp. 551–552 (1987).

*Primary Examiner*—Robert Spitzer
*Attorney, Agent, or Firm*—Connolly & Hutz

[57] ABSTRACT

Carbogenic molecular sieve devices comprising a porous support (e.g., a metal support) having a carbogenic molecular sieve membrane attached to one or more surfaces of the support so that small pores in the membrane are in communication with larger pores in the support and methods of making the devices.

20 Claims, 25 Drawing Sheets

Gas - SF$_6$
- 293 K
- 328 K
- 353 K

SUPPORTED CARBOGENIC MOLECULAR SIEVE MEMBRANE AND METHOD OF PRODUCING THE SAME

BACKGROUND OF THE INVENTION

Membranes have gained considerable importance as an inexpensive, low energy alternative to distillation for separation of gases. In particular, sieving of molecules based purely on size differences has emerged as a mechanism for obtaining extremely high selectivities of a particular component.

Currently, inorganic membranes constitute the bulk of separation materials, mostly for their stability at high temperatures. Other potential candidates for use as membrane materials include zeolites, polymers, ceramics and Carbogenic Molecular Sieve materials (hereinafter sometimes referred to as "CMS" or "CMS materials"). CMS materials have the advantage of being relatively inexpensive compared to zeolites, more temperature resistant than polymers and less brittle than ceramics Numerous studies have shown that a relatively narrow pore size distribution of 4–6Å can be obtained by controlled pyrolysis of CMS precursor materials. Thus, it would be advantageous to utilize CMS in the form of a membrane to perform molecular sieving.

CMS materials can be derived from natural sources such as wood and coconut shells, as well as synthetic polymer precursors. The basis for their sieving action arises from the complex microstructure, which has been described as consisting of a network of aromatic domains and amorphous carbon. Disclinations between the various domains result in predominantly slit-shaped pores than can exclude certain molecules on the basis of size and shape. However, unlike zeolites, which have a unique pore size, CMS typically has a distribution of pore sizes that can range from 3 to 10Å. one application of CMS is in the separation of nitrogen and oxygen using the pressure swing adsorption method. The kinetic diameters of the two molecules differ by a mere 0.2Å—but careful control of the pore size results in very high selectivities for oxygen. This example also demonstrates the difference between a CMS, which performs true molecular sieving, and an activated carbon, whose performance is based on the difference in the adsorption equilibrium of gases. As nitrogen is more strongly adsorbed on activated carbon than oxygen, it would be held back and would have to be desorbed when the separation was complete. In a CMS, however, the equilibrium uptakes of both gases are the same—hence, the time of sieving becomes important to obtain a high selectivity.

CMS materials have been synthesized using a variety of different polymeric precursors. The controlled deposition of pyrolyzed carbon to narrow pores in activated carbons and other supports has also been studied extensively. Established synthesis methods involve pyrolyzing the precursor at a high temperature in an inert gas flow. However, not all polymers can be utilized for CMS production—this depends on whether they undergo cross-linking at high temperatures or not. The thermodynamically preferred structure for carbon at high temperatures is graphite. In the case of "graphitizing" polymers like PVC, graphite-like layers are formed at around 1000° C., which results in a considerable decrease in microporosity of the material. Hence, the resulting carbon is not suitable for gas separations. On the other hand, PAN, PVDC and PFA cross-link at high temperatures to stabilize the structure and prevent the formation of graphite layers. This "non-graphitizing" character of the polymers is due to the presence of heteroatoms such as oxygen and nitrogen, as well as excess hydrogen. The pore sizes obtained are between 4–6 Å, which make them ideal for use as molecular sieves.

CMS materials are globally amorphous and do not exhibit any long range order as evident in zeolites. X-ray diffraction studies, which can resolve features on a length scale of 25 Å, do not reveal a distinct diffraction pattern for the microstructure. HRTEM studies of the structure combined with FFT analysis, can be used to determine the spacing between the graphite layers. The structure of CMS is thought to consist of a tangled network of ribbon-like aromatic regions. The evolution of the microstructure depends on the polymer precursor as well as the pyrolysis parameters of soak time and temperature. Investigations have shown that for most precursors, high temperature sintering leads to shrinkage of pores. There is, however, a collapse of the structure above a certain temperature, leading to a loss in the sieving property. A comprehensive review of CMS materials has been carried out by Foley (see Foley, H. C., Carbogenic Molecular Sieves: Synthesis, Properties and Applications; Microporous Materials, 1995;4; pp. 407–433).

There are two forms of CMS membranes—the unsupported "hollow fiber" form, and the supported form. The hollow fiber membrane was developed by Koresh and Soffer (see Koresh, J. E. and A. Soffer, Molecular Sieve Carbon Permselective Membrane Part I. Presentation of a New Device for Gas Mixture Separation; Separation Science and Technology, 1983; 18 (8); pp. 723–734) by pyrolysis of polyacrylonitrile (PAN) fibers. Despite their good sieving properties, the membranes lacked the requisite mechanical strength for use in various applications. A hollow fiber also cannot be converted easily into a module form that would be suitable for industry.

Supported CMS membranes can be synthesized using numerous techniques such as dip coating, spin coating, vapor deposition and sputtering. The ideal structure of such a membrane is shown in FIG. 4. It consists of a thin CMS layer 5 on top of a macroporous, non-selective support 7. The support provides mechanical strength to the membrane, which is a considerable improvement over the hollow fiber configuration. It also has the advantage of being available in various geometries such as flat plates, tubes and disks, which can be used depending on the requirements of the particular application. The support should be an inexpensive material and the pores in the support should be much larger than those in the CMS layer. For example, the pores in the support should be at least twice as large as the pores in the CMS material. In a preferred embodiment of the present invention, the pores in the support are from 5–500,000 times as large as the pores in the CMS material. In the most preferred embodiment of the present invention, the pores in the support are from 10 to 2,000 times as large as the pores in the CMS material.

Although the actual size of the pores in the various support materials can be widely varied, the nominal diameter of the pores in the support material should be greater than 100Å (e.g., typical pore sizes in the support material are from 0.1 to 100 $\mu$m in diameter). The size of the pores in the CMS material can also vary, but over a much narrower range. For example, the nominal diameter of the pores in the CMS material is generally from 3–100Å. Preferably, the nominal diameter of the pores in the CMS material is from 3–20Å. In the most preferred embodiment of the present invention, the nominal diameter of the pores in the CMS material is from 3–10ÅA.

CMS membranes have been successfully prepared on porous graphite and ceramic supports. These supports overcome the disadvantage of the hollow fiber configuration by providing durability to the membrane. However, neither of these materials is a good choice for process unit construction compared to metals and alloys. Further, the issue of forming a workable module of the composite membrane needs to be addressed. To successfully use the membrane, it must be put into a module that creates two zones for gas flow separated by the membrane. The critical parts of the module are the points of contact between the membrane and the module wall. These contact points are called end fittings or edge fittings in the case of a planar membrane. The fittings (seals) must provide complete isolation of the two sides of the membrane and should be devoid of any leaks that can create transport through a route other than the CMS layer. It is nearly impossible to fabricate leak free end fittings and modules for graphite and ceramic supported membranes. In the event that modules have been constructed, special end fittings were required, which would increase the cost if the process were commercialized. Thus, graphite and ceramic supports, while a definite improvement over hollow fiber membranes, are not able to meet the requirements of an industrial scale separation process.

One of the first attempts at making supported CMS membranes was by Bird and Trimm (see Bird, A. J. and D. L. Trimm, Carbon Molecular Sieves Used in Gas Separation Membranes; Carbon, 1983; 21; p.177). They pyrolyzed polyfurfuryl alcohol (PFA) on various support materials including silica frits, sintered bronze and copper and iron gauzes. Experiments were carried out to measure the diffusivities of various gases as a function of temperature. The researchers encountered the problem of being unable to create a uniform, defect free layer on any support surface, with the exception of silica frits. The control of the CMS microstructure was also very poor—membranes synthesized under similar conditions exhibited widely varying behavior in terms of gas diffusivities. However, there was some degree of separation obtained between gases, and this was attributed to flow through cracks as well as surface diffusion on the carbon. There was some evidence of activated diffusion as well, and activation energies were obtained for different gas-support material pairs.

Rao and Sircar (see Rao, M. B. and S. Sircar, Nanoporous Carbon Membranes for Separation of Gas Mixtures by Surface Selective Flow; Journal of Membrane Science, 1993; 85; pp. 253–264) developed the "Surface Selective Flow" (SSF™) membrane, in which the primary mechanism for gas separation was the difference in surface flow of various gases on carbon. The membranes were synthesized by coating a layer of poly(vinylidene chloride)-acrylate terpolymer latex on a macroporous graphite disk with a pore size of 0.7 $\mu$m. The samples were pyrolyzed at 1000° C. in a nitrogen stream, and the coating procedure was repeated to increase the carbon layer thickness. SEM analysis revealed a crack-free membrane with a layer thickness of approximately 2.5 $\mu$m. As compared to other separation mechanisms like Knudsen and molecular sieving, surface flow by selective adsorption was found to have several advantages. Components present in low concentrations could be separated, which eliminated the need for a large pressure drop across the membrane. Also, since surface adsorption increased at lower temperatures, ambient operating conditions improved the selectivity. The membrane was used to separate hydrocarbons from hydrogen and hydrocarbon mixtures and provided high selectivities for the former. Graphite supports were also used by Chen and Yang (see Chen, Y. D. and R. T. Yang, Preparation of Carbon Molecular Sieve Membrane and Diffusion of Binary Mixtures in the Membrane; Industrial and Engineering Chemistry Research, 1994; 33; pp.3146–3153) to synthesize membranes from polyfurfuryl alcohol (PFA). Again, the carbon layer was found to be crack free and its thickness was 15 $\mu$m. Diffusivities of gases in the membrane were found to be concentration dependent. The experimental data was explained quite well by the binary diffusivity theory developed by the authors.

SUMMARY OF THE INVENTION

The present invention provides a new form of carbogenic molecular sieve (CMS) membranes which possess high mechanical strength, simple fabrication procedure and are readily assembled into modules. These composite membranes, which comprise CMS on a porous support material, can be used for small molecule separations or for combined separation and chemical reaction, especially catalytic reactions. In the first application, these membranes are used strictly for separation of molecules, while in the second instance, a catalyst can be incorporated within the module to convert it into a reactor.

The membrane is a composite that has the mechanical strength of the support and molecular sieving properties of the CMS material—characteristics that are not available in either material separately. This is the major advantage of the invention disclosed herein.

DETAILED DESCRIPTION OF THE INVENTION

Figure 1:
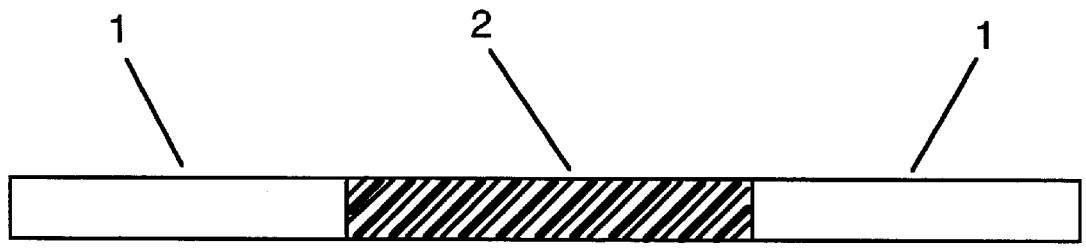
FIG. 1 shows the setup formed in Example 1.

The present invention represents a breakthrough in membrane separation technology. The CMS membrane is prepared on the surface of a support material, for example, a prefabricated, porous, stainless steel plate or tube. This is done by coating the surface of the support material with a suitable polymer precursor. Some amount of the polymer impregnates the pores of the support material as a result of the capillary pressure exerted by the pore walls. The support can have pore sizes ranging from 0.1 to 100 $\mu$m in diameter. After pyrolysis, a layer of carbon is formed on the support, with some carbon reducing the effective diameter of the pores in the support. It is desirable to repeat this procedure several times to build up a thin layer of CMS of uniform resistance on the surface. This configuration is better than narrowing down pores as the problem of some pores being left open, thus providing a leak through the membrane, does not arise. The resulting membrane is a series of micromembranes stacked on the surface of the porous support. The pore walls of the support create the boundaries of the carbon membrane and give the composite, carbon/metal membrane much greater strength than graphite or ceramic.

In a preferred embodiment of the present invention, the problem of end fittings or edge fittings, is solved by the use of a metal support. The metal support can be prefabricated to very small tolerances and does not require the use of expensive custom-made fittings to ensure the complete isolation of the two sides of the membrane. In a preferred embodiment of the present invention, which will be discussed in more detail later, the support is a porous metal (e.g., porous stainless steel) tube. After the membrane is formed by building up a layer of CMS material on the outer surface of the porous tube, the membrane can be incorporated into a shell (i.e., to form a tube in shell device) to create two zones for gas flow that are separated by the membrane. The porous metal tube can be attached (e.g., by welding) at both ends to two lengths of non-porous tubes, for example, non-porous stainless steel. This attachment is crucial, but requires no special expertise beyond that which one trained in the art of connecting pieces of metal would be required to have. The shell is then easily attached to the inner tube to create the module using standard compression or vacuum fittings. The membrane module can be used individually, or with several identical units, to provide low energy molecular sieving separations for industry. The module can be assembled and disassembled very quickly, which would facilitate inspection and replacement of the membrane in commercial practice.

To summarize, the novel features of the CMS membrane described herein are its high degree of mechanical strength and ease in forming a working module. It also has high temperature stability that sets it apart from zeolites and polymers. Coupled with the inherent molecular sieving nature of CMS, these characteristics make the supported CMS membrane eminently suitable for gas separations.

The immediate use of the supported CMS membranes to gas separations has been demonstrated in the experiments described below. The membranes are very robust and convenient to utilize, for example, in the form of a shell and tube module. Separation of nitrogen and oxygen is currently carried out using CMS in powder form. This could be easily replaced by the tubular or disk membranes of the form described in the instant application. The easy disassembly of the module would be helpful in membrane replacement. The membranes can also be "tailor-made" to carry out virtually any gas separation based on molecular size difference, simply by adjusting the synthesis conditions.

The application of the membrane to catalytic reactions is also a topic of great interest. Membranes of inorganic materials such as palladium have been shown to improve the yields of dehydrogenation reactions by selective removal of hydrogen from the reaction mixture. One might envisage the same application using CMS membranes, wherein the module could be packed with a catalyst converting it into a reaction cum separation unit. CMS is an inert material and thus would not be affected by or poison catalytic reactions which inorganic materials might do. The synthesis of a catalytic CMS membrane reactor is also a possibility. Catalytic sites could be introduced into the carbon microstructure, opening up the possibility of carrying out shape selective catalysis in the module form to obtain certain desirable products.

In a preferred embodiment of the present invention, the support is made of metal. Metal supports for CMS, in addition to providing high mechanical strength, also have good heat transfer characteristics and temperature stability. This makes them ideal for use in high temperature applications, where polymeric membranes and zeolites would degrade.

The membranes produced in the following Examples (i.e., Examples 1–3) were tested to determine their permeability to various gases. Schematic diagrams of the apparatus used in the tests are shown in FIGS. 5, 6, 15 and 16.

In Example 1, the probe gas permeabilities were measured by connecting a pressure gauge to $S_2$ and closing $T_2$. $S_1$ was closed during the experiment. The pressure on the shell side ($P_{SS}$) was monitored as a function of time (t) while the gas was flowing through the membrane. The tube side pressure ($P_{TS}$) was constant and there were no leaks in the apparatus.

Both sides of the membrane were initially at atmospheric pressure. Writing a mass balance for the shell side, we have $$\frac{dm}{dt} = J \cdot M_w$$

where m=mass of gas, J=molar flux across membrane and $M_w$=molecular weight.
The flux across the membrane can be expressed as $$J = \frac{P_0}{L}(P_{TS} - P_{SS})$$

$P_o$=gas permeability, L=membrane thickness.
Using the ideal gas law, the mass of gas can be expressed in terms of $P_{SS}$ and the final expression is $$\frac{dP_{ss}}{dt} = \frac{ART}{V_{ss}}\left[\frac{P_0}{L}(P_{TS} - P_{SS})\right]$$

where $V_{SS}$= shell side volume and A=membrane surface area, $$R = 82.059 \frac{cm^3 atm}{mol\, K} \text{ (proportionality constant)}$$

and T=temperature K.
Integrating from t=0 ($P_{SS}$=0 psig), we get $$\frac{\ln P_{TS}}{P_{TS} - P_{SS}} = \frac{ART}{V_{SS}} \frac{P_0}{L} t$$

Thus, a plot of the left hand side expression versus t gives the permeability of the gas. A typical plot is shown for a sample prepared with polyvinyl alcohol (PVA) as the polymeric carbon precursor at a synthesis (soak) temperature of 600° C. in FIG. 7, where helium was used as the probe gas. The units of permeability are mol/cm²s atm. Experiments were carried out at ambient temperature and a pressure range of 30 to 70 psig (3 to 6 atm).

Steady state experiments to determine the primary transport mechanism(s) through the membrane were also performed. During the runs, $S_2$ was connected to a pressure gauge followed by a rotameter and finally a soap bubble flowmeter. Again, $S_1$ and $T_2$ were kept closed. The rotameter was used to control the flowrate of the gas through the membrane and hence maintain a desired pressure gradient across the CMS layer. The upstream tube pressure was varied and readings were taken for flowrate at different pressure gradient values. The permeability was defined as the volumetric flowrate divided by the pressure gradient and had units of cm³/minute (min) psig.

Experiments were also performed at elevated temperatures and permeabilities were measured using the pressure rise technique described in the previous section. As described in Example 1, the shell and tube unit was wrapped in heating tape connected to a variac. A J-type thermocouple inserted through $T_1$ monitored the temperature at the center of the membrane. Runs were performed at intervals of 1–2 hours to allow the system temperature to stabilize. The highest temperature of any run was 172° C., well below the pyrolysis temperature of the membrane.

SEM analysis of the membranes was also carried out. The samples were cut into sections and mounted in an epoxy mold. The surface was sputtered with gold and the cross section was observed.

Figure 8:
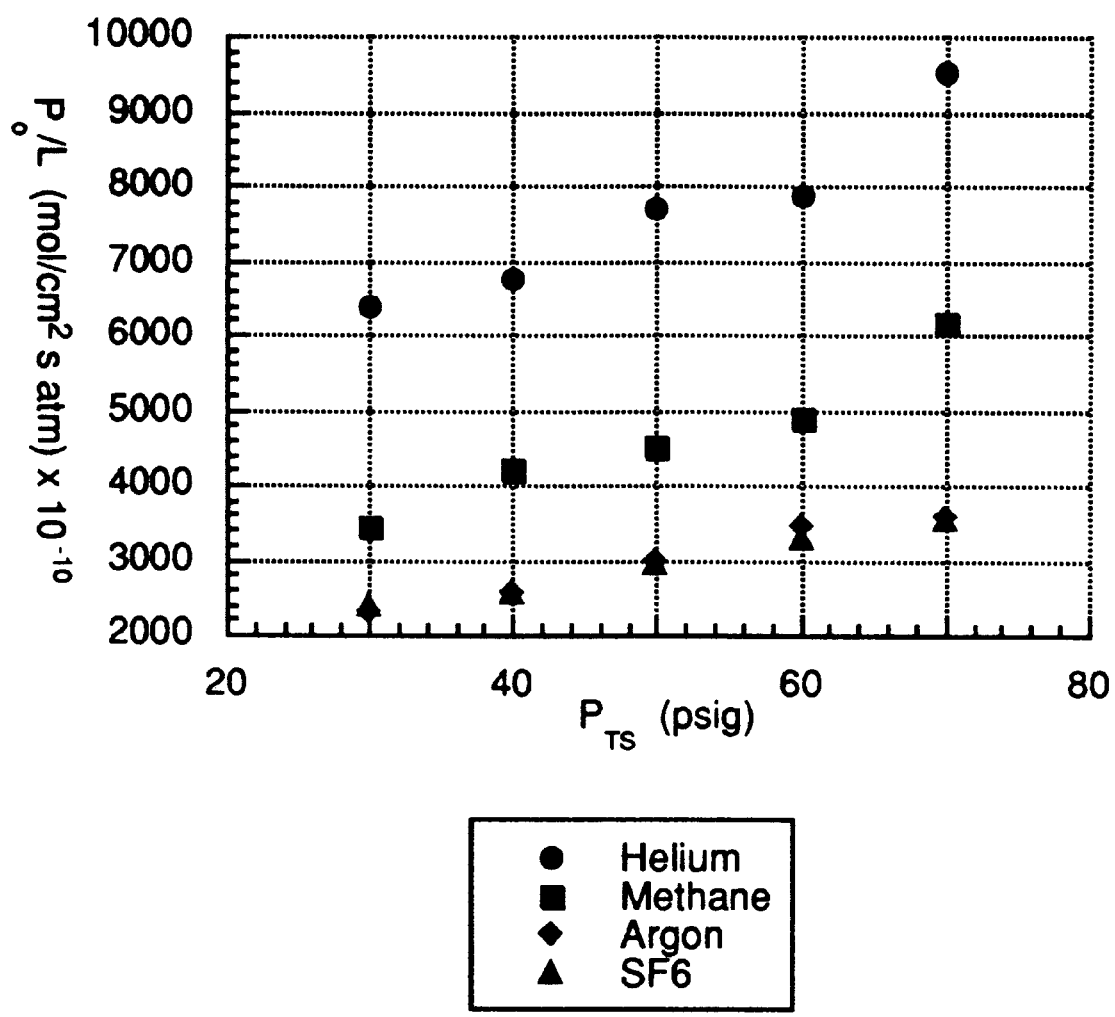
FIG. 8 is a plot of $P_o/L$ vs. $P_{TS}$ for various gases using the shell and tube membrane formed at 600° C. in Example 1.

The permeability of the probe gases were obtained from the pressure rise method. FIG. 8 shows the experimental data for permeability as a function of upstream tube pressure for a 600° C. sample. The data points lie more or less in a straight line, the slope of which changes for different gases. There is a decrease in the slope from helium, a light molecule, to argon, a heavier molecule. The permeability of the gases was seen to have an inverse relationship with their molecular weights (with the exception of $SF_6$). This suggests a transport mechanism similar to Knudsen flow, in which the permeability is inversely proportional to the square root of the molecular weight of the gas. Similar results were also seen for samples prepared at other temperatures. However, the presence of pore size distribution in the carbon layer implies there are several different mechanisms that can account for gas flow. Indeed, the overall transport could have contributions from molecular sieving, Knudsen flow and surface diffusion in micro and mesopores, and convective flow behavior in the macroporous regime. Thus, the rather high permeability of $SF_6$ as seen in FIG. 8 is probably due to a large surface diffusion contribution to the flow. The dominant mechanism would depend on the size and nature of the diffusing molecule.

Figure 9:
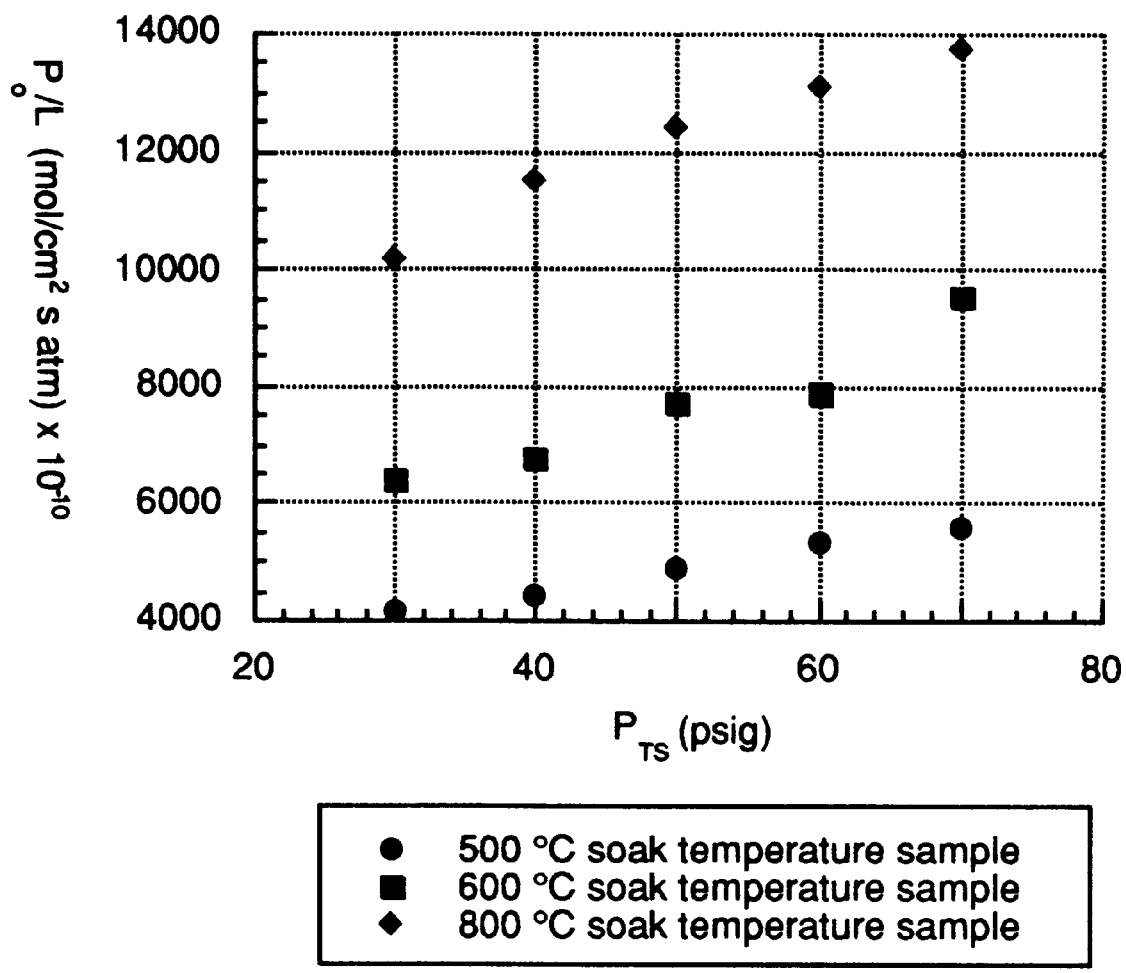
FIG. 9 is a plot of $P_o/L$ vs. $P_{TS}$ for helium using the shell and tube membranes formed at 500° C., 600° C. and 800° C. in Example 1.

FIG. 9 shows the data for permeability of helium as a function of upstream tube pressure for the three different membrane samples. The permeability of different gases under identical conditions was found to increase with increasing preparation temperature of the samples. This behavior is consistent with the current understanding of the evolution of the microstructure in CMS. At low temperatures, CMS has very little porosity and pores are virtually non-existent. Increasing the temperature leads to pore formation and a sudden rise in diffusivity of various molecules. At some temperature, the microdomain alignment increases and pores begin to shrink once again. Similarly, the overall pore volume of the CMS (observed from equilibrium uptake measurements) increases up to a certain temperature, above which the microstructure collapses.

Diffusivity of a gas is not affected by changes in pore volume-hence, measurements of diffusivity would only reflect a varying pore size. Pseudo-equilibrium uptake experiments (see Mariwala, R. K. and H. C. Foley, Evolution of Ultramicroporous Adsorptive Structure in Poly(furfuryl alcohol)-Derived Carbogenic Molecular Sieves; Industrial and Engineering Chemistry Research, 1994; 33; pp. 607–615) indicated an increase in diffusivity for small molecules like $O_2$, $N_2$ and $CO_2$ with increasing synthesis temperature, followed by a decrease above 600° C. This agrees with the hypothesis of a microstructure in which pore sizes first increase and subsequently decrease On the other hand, permeability is dependent on both the pore size and pore volume of the medium. Hence, even though pores might be shrinking, an increasing pore volume could lead to higher permeabilities. This observation allows us to explain the permeability characteristics of the membranes of the present invention. The membrane derived from PFA at 500° C. can be regarded as having an "underdeveloped" microstructure, with few pores of large size. Gases exhibit moderately high values of permeability through the membrane. In membrane derived from PFA at 600° C., pore sizes are smaller (see Mariwala, R. K. and H. C. Foley, Evolution of Ultramicroporous Adsorptive Structure in Poly(furfuryl alcohol)-Derived Carbogenic Molecular Sieves; Industrial and Engineering Chemistry Research, 1994; 33; pp.

607–615) and this would suggest lower permeabilities—but the increased pore volume or "openness" of the microstructure overrides this effect. The pores are not small enough to offer shape selectivity—hence, the decrease in pore size is not as significant for overall membrane transport as an increasing pore volume. For the case of the membrane derived from PFA at 800° C., the pore volume increases still further and permeabilities also rise. We would expect that a membrane synthesized at 1000° C. would have very low permeability due to the microstructure collapse observed for powdered PFA derived CMS.

In a preferred embodiment of the present invention, where the CMS membrane is derived from PFA, the pyrolysis temperature is from 500–800° C. In another preferred embodiment of the present invention, the pyrolysis temperature (PFA→CMS) is from 550–750° C. In the most preferred embodiment of the present invention, the pyrolysis temperature (PFA→CMS) is from 600–700° C.

Figure 10:
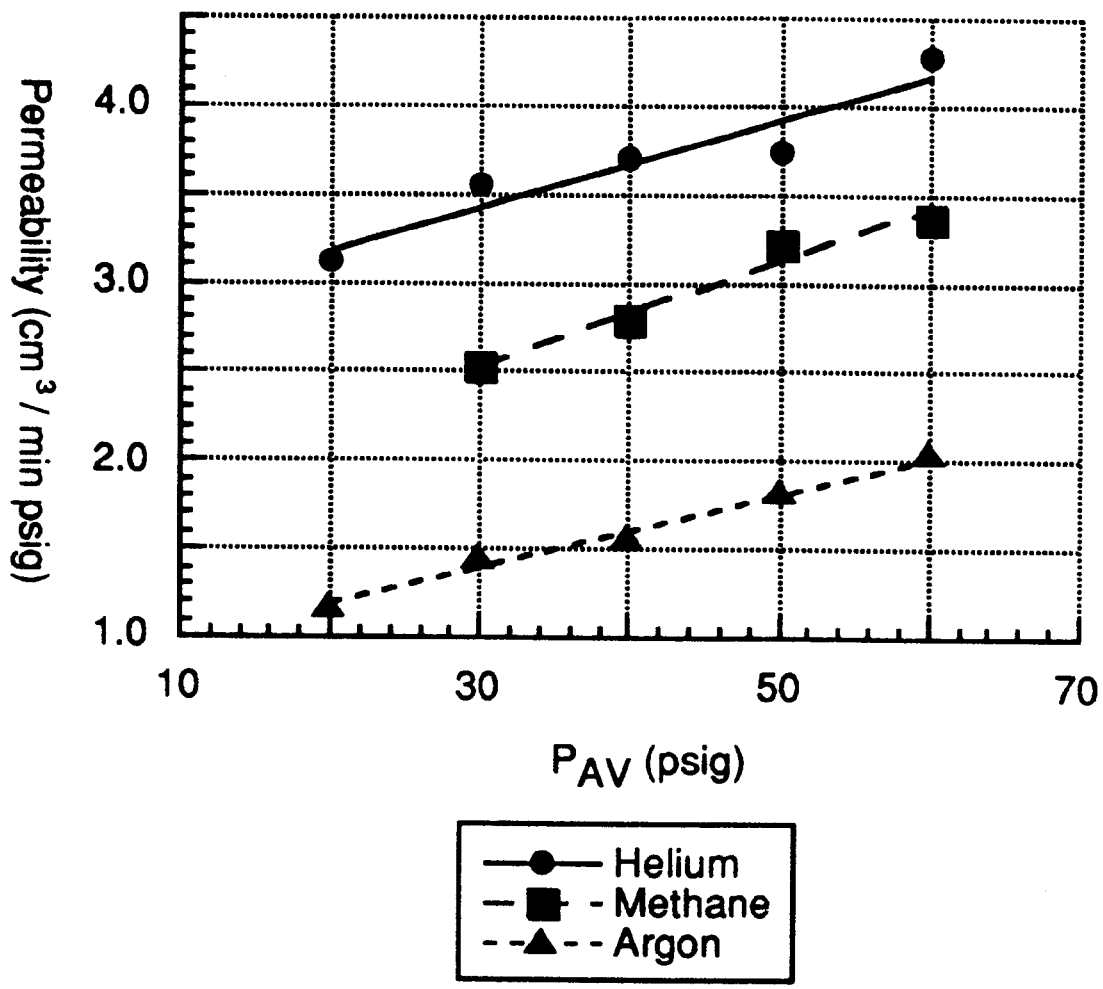
FIG. 10 is a plot of permeability vs. $P_{AV}$ for various gases using the shell and tube membrane formed at 600° C. in Example 1.

Membrane permeabilities were also measured in the steady state experiments. FIG. 10 is a plot of gas permeability as a function of the average pressure across the membrane prepared at 600° C. The average pressure was defined as half the sum of the shell and tube side pressures during a run. The data was taken for a constant gradient of 20 psig across the membrane. The permeability is seen to vary almost linearly with average pressure over a wide range of upstream pressures. This behavior can be explained by the analysis of gas flow in a porous medium proposed by Knudsen (see Knudsen, M., Die Gesetze der Molekularstromung und der inneren Reibunqsstromung der Gase durch Rohren: Annalen Der Physik, 1909; 28; pp.75–130). He examined the transition region from convective flow to molecular streaming and proposed that the permeability of a gas could be expressed as $$P_m = aP_{av} + b\frac{1 + c_1 P_{av}}{1 + c_2 P_{av}}$$

where $P_{av}$=average pressure across membrane.

The first term represents convective flow and is dominant at high pressure, while the second term denotes Knudsen flow under conditions of low pressure. The constants a, b, $c_1$ and $c_2$ are related to physical properties of the system like density and viscosity of the gas and effective pore radius. The data for the membranes of the present invention, therefore, would seem to indicate that gases are transported by convection across the membrane, with possible contributions from Knudson flow at the lower pressures of operation. There is also the possibility that cracks in the membrane could lead to viscous flow (see Uhlhorn, R. J. R., et al., New Ceramic Membrane Materials for Use in Gas Separation Applications; Science of Ceramics; p. 552).

Figure 11:
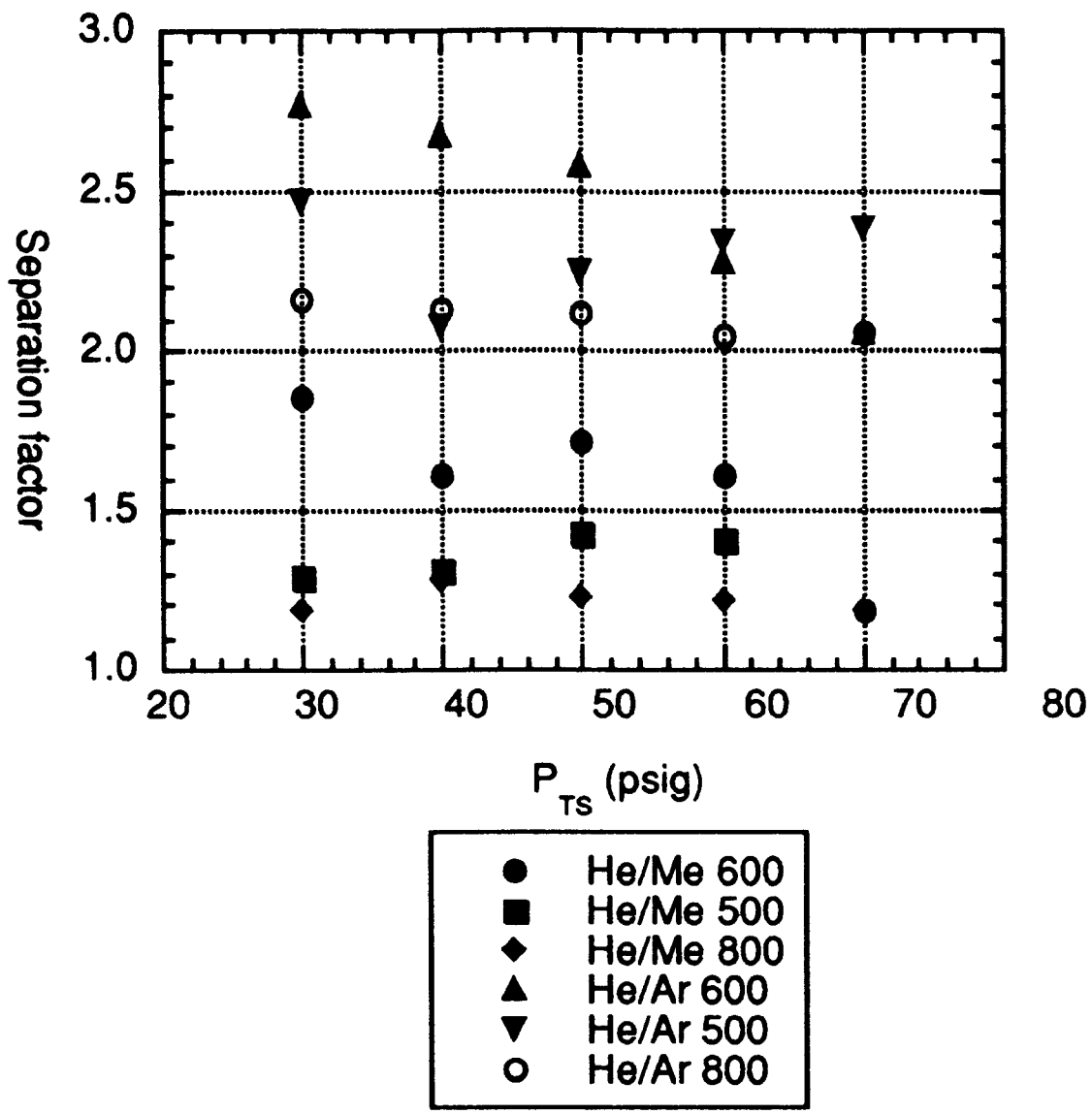
FIG. 11 is a plot of the separation factor vs. $P_{TS}$ for various gas mixtures using the shell and tube membranes formed at 500° C., 600° C. and 800° C. in Example 1.

The separation factor for a pair of gases was defined as the ratio of permeabilities of the gases at a given operating condition. A plot of separation factor versus upstream tube pressure is shown in FIG. 11 for the three samples prepared at different soak temperatures. The separation factor was found to decrease monotonically with increasing pressure for the 600° C. sample. If the data is extrapolated back to a zero upstream pressure, the Knudsen limit of separation is approached, defined as the ratio of the inverse square root of the molecular weights of the two gases. The tendency toward Knudsen flow at low pressures is consistent with the analysis of the steady state data. The highest achievable separation, therefore, is the Knudsen limit, and convective flow leads to lower selectivities through the membrane. The dependence of separation factor on pressure was not as evident for the other two membranes—in fact, it was almost a constant for the 800° C. sample. This illustrates the difference in CMS microstructure synthesized at different temperatures.

We also noted a maximization of the separation factor in the 600° C. membrane, which can be explained based on the evolving pore size distribution of the CMS. As the pyrolysis temperature is increased, the average pore size decreases. In the 500° C. membrane, the pore sizes are large enough to allow all gases to flow through easily, hence separation factors are low. The 600° C. membrane, however, contains a significant fraction of smaller pores, which hinder the transport of methane and argon to a larger extent than helium (based on size and molecular weight considerations). When the pores are further reduced in size in the 800° C. sample, even helium flow is restricted. Thus, the separation factor is lowered once again. The separation factor depends on the interaction between a molecule and the pore size distribution of the CMS microstructure.

The desirable property of any membrane is a high perm-selectivity toward a particular component. This does not imply the highest possible selectivity, as the permeability might be very low (as would be the case if the 600° C. membrane were operated at low pressure). Based on our experiments, the 800° C. membrane exhibits the best perm-selectivity, though the 600° C. membrane has the highest selectivity under all conditions. The operating conditions can also be varied to change the perm-selectivity.

Figure 12:
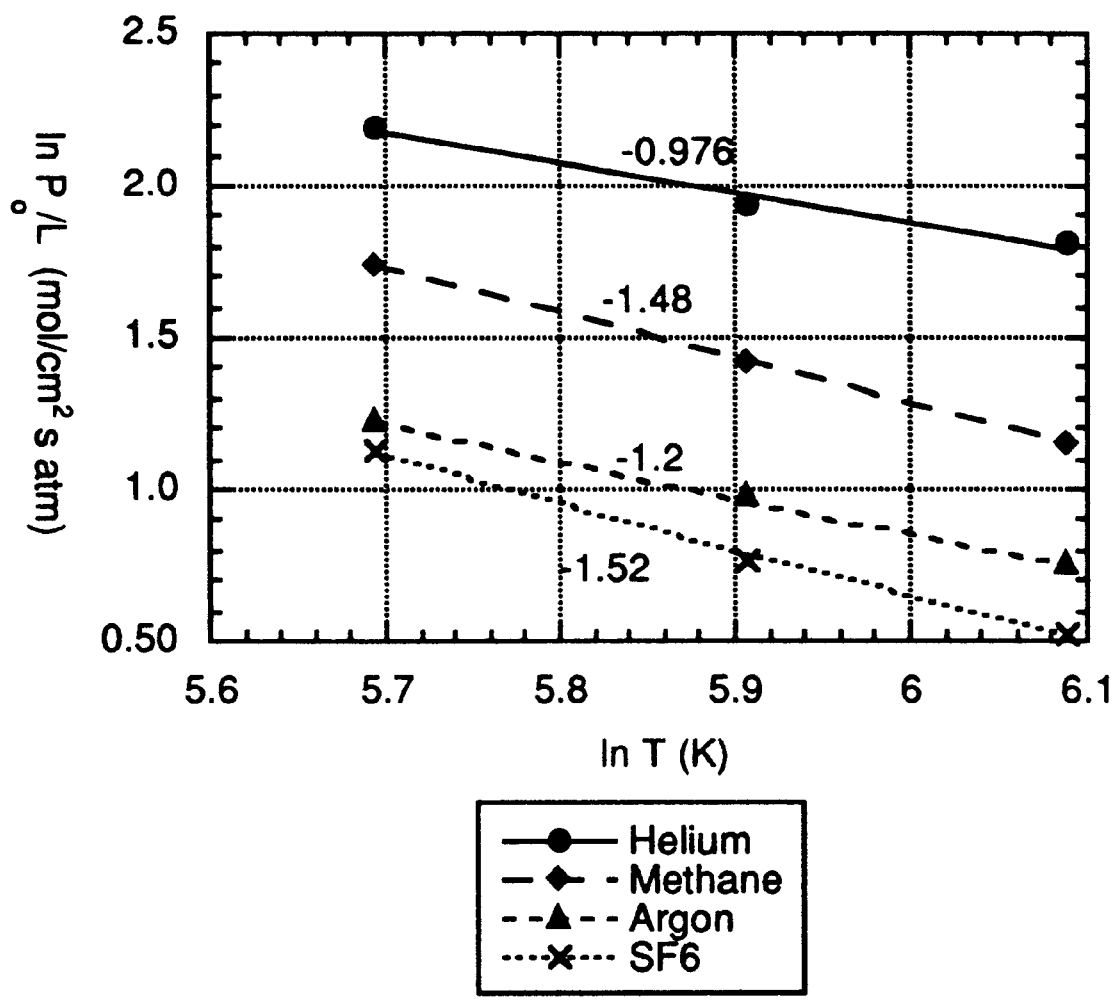
FIG. 12 is a plot of in $P_o/L$ vs. in T for various gases using the shell and tube membrane formed at 600° C. in Example 1.

The permeability of all gases (upstream pressure=30 psig) was found to decrease as a function of increasing temperature when the membrane produced at 600° C. was used, as shown in FIG. 12. The data points were fitted well by straight lines on a log-log plot and the temperature dependence (slope of the line) was larger for the heavier gases. Again, a combination of convective and Knudsen flow can explain this behavior. For purely Knudsen transport, the permeability of a gas is inversely proportional to the square root of the temperature (a slope of −0.5). On the other hand, for convective flow, we have $$P_m \sim \frac{1}{\mu T}$$

where $\mu$=gas viscosity.

Since $\mu$ varies as $T^{0.5}$, the convective permeability should have a temperature dependence of $T^{-5}$. The slopes of the various lines in FIG. 12 are bounded by the regimes of purely Knudsen and convective flow, with dominance of the latter mechanism. There is also the possibility of surface flow for the adsorbing gases argon and $SF_6$. At high temperatures, the adsorption of these gases on carbon decreases drastically. Hence, the component of surface transport is diminished, leading to the decrease in permeability. The unequal permeability decrease for different gases leads to higher separation factors at elevated temperatures.

Figure 13:
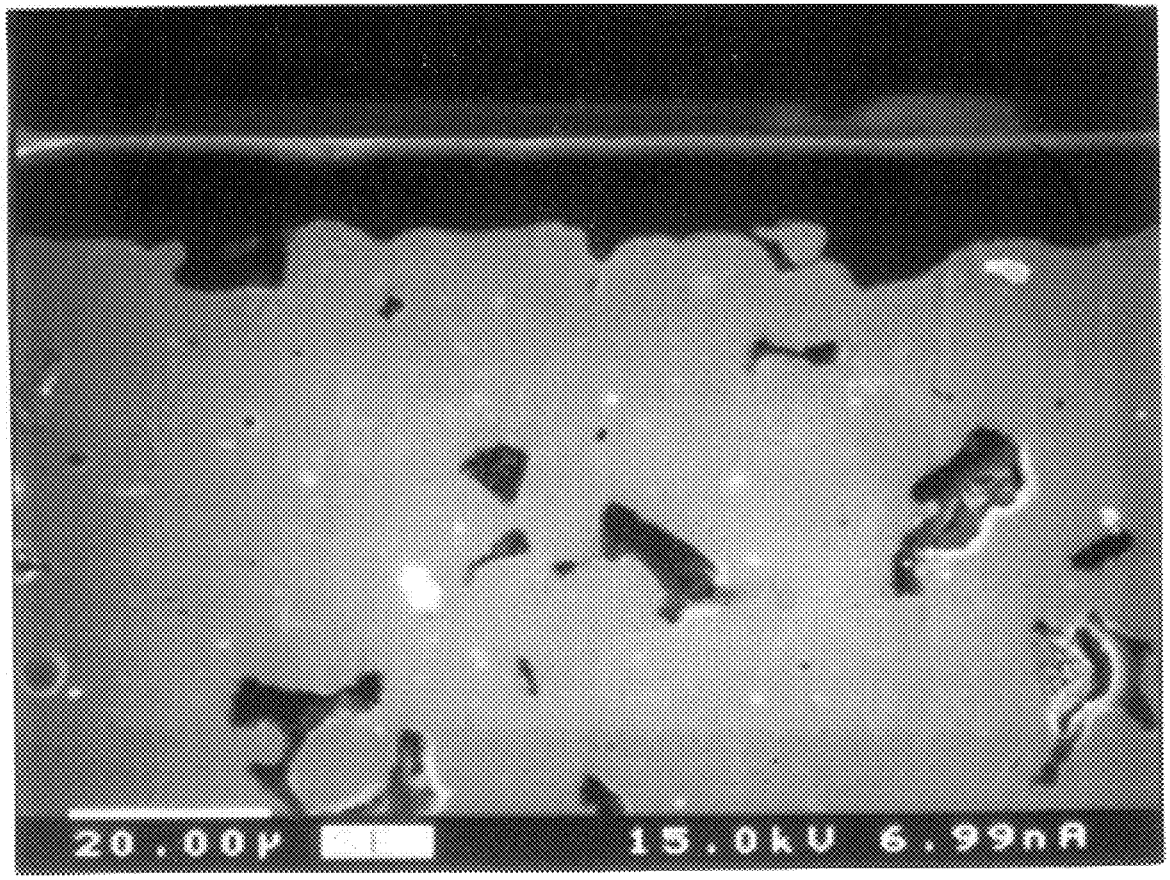
FIG. 13 is an SEM micrograph at 4000× magnification of a CMS membrane formed on a flat metal plate.

An SEM micrograph of a flat plate membrane is shown in FIG. 13. The micrograph was recorded on a JEOL JSM-840 scanning microscope at a scanning voltage of 15.0 kV and 4,000× magnification. The sample was coated 10 times with 60 wt% PFA in acetone solution (i.e., a weight ratio of PFA to acetone of 60:40) and pyrolyzed at 600° C. The macroporous support had a pore size of 0.2 $\mu$m. The micrograph clearly reveals a layer of pyrolyzed carbon of average thickness 10 $\mu$m on the support surface. Samples prepared on larger pore supports had thinner layers under the same synthesis conditions, due to penetration of the precursor into the matrix.

Figure 14:
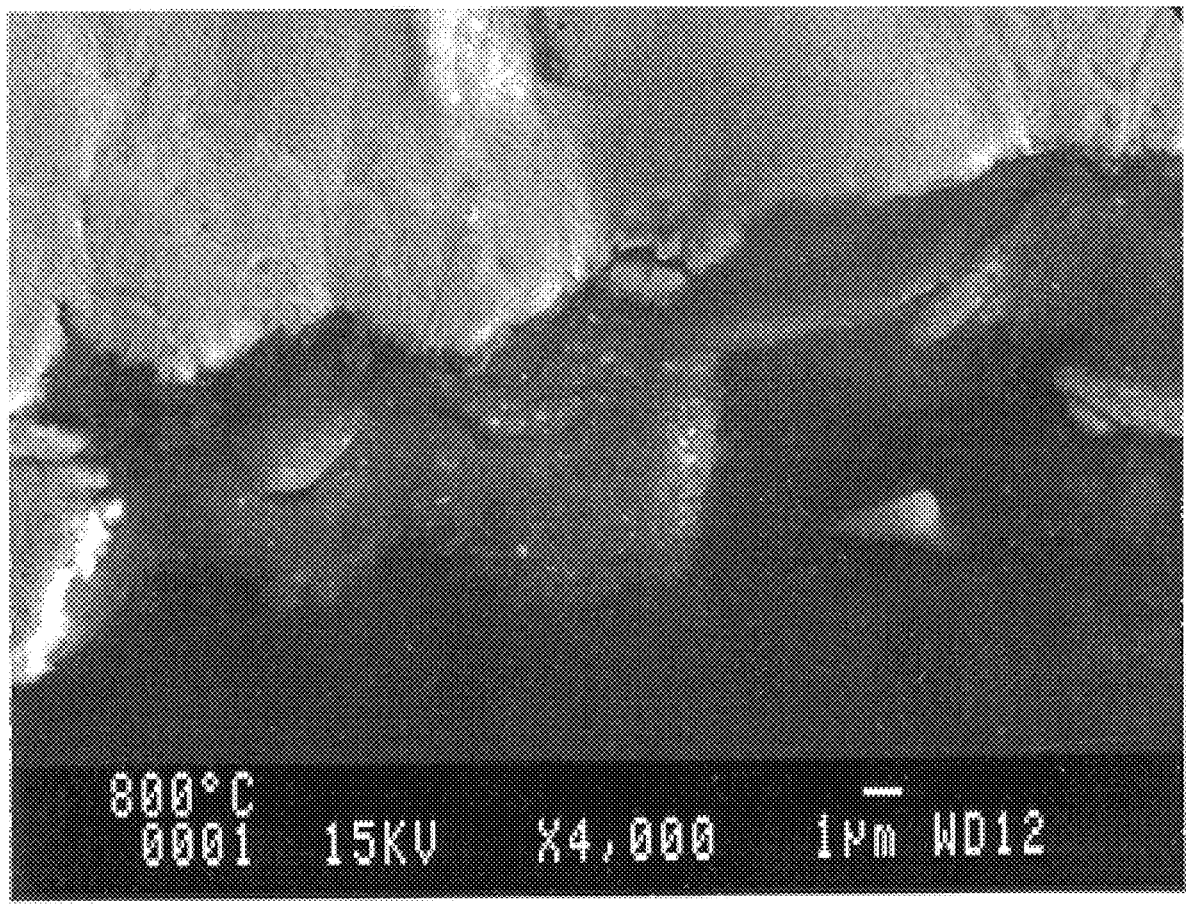
FIG. 14 is an SEM micrograph at 1000× magnification of a cross-section of a CMS membrane formed on a tubular metal substrate.

FIG. 14 shows an SEM micrograph of a tubular membrane with 5 coats of precursor solution (i.e., a solution of PFA and acetone in a weight ratio of 60:40) pyrolyzed at 800° C. The micrograph was obtained on a JEOL JSM-840 scanning microscope at a voltage of 15 kV and 1,000× magnification. The support had a pore size of 0.5 µm. There does not appear to be a CMS layer on the surface as seen in the flat plate. This was probably due to a fragmentation of the layer while the sample was being cut prior to SEM analysis. It is also possible that the membrane is not truly asymmetric but consists of pyrolytic carbon dispersed inside the macroporous support. This could also explain the dominant convective flow behavior of all the membranes. If the carbon has not narrowed down all pores evenly, there would be cracks and defects in the structure, which would act as low resistance pathways and allow gases to flow with no selectivity at all. A uniform layer on the support is essential to ensure consistent sieving action by the membrane.

In the following Examples, various supported CMS membranes are derived from a PFA precursor material at pyrolysis temperatures from 500° C. to 800° C. While the use of the PFA precursor material to form the CMS membranes is a preferred embodiment of the present invention, the scope of the invention should not be limited to the use of PFA as the precursor material or to the use of pyrolysis temperatures of from 500° C. to 800° C. The use of other precursor materials, such as PAN and PVDC, and other similar polymers, is considered to be within the scope of the present invention. Generally, suitable pyrolysis temperatures for these materials will be between 500–1200° C. However, for each of these polymeric precursor materials, a person skilled in the art would either know or be able to easily determine the most desirable pyrolysis temperature for forming the CMS material.

EXAMPLE 1

Production of Tubular Membranes

A support consisting of a six inch (15 cm) long porous sintered stainless steel 316 tube of 0.25 inch outer diameter, 0.125 inch inner diameter and average pore size of 0.5 micron (Mott Catalog Number 2304-604-06-604-0.5-AB) was welded at each end to a nine inch long non-porous stainless steel 316 tube to form the setup shown in FIG. 1, where the support is shown as 2. Each of the two nine inch long non-porous stainless steel tubes 1 had an outer diameter of 0.25 inch and an inner diameter of 0.125 inch. Furfuryl alcohol resin (PFA) obtained from Monomer-Polymer and Dajac Laboratories (Feasterville, Pa., Lot A-1-143) was applied by hand painting the outer surface of the porous tube evenly with an ordinary paint brush using a precursor solution consisting of the PFA resin dissolved in acetone. The precursor solution contained about 60% by weight of PFA in the acetone (i.e., a 60:40 weight ratio of PFA to acetone). The acetone was not observed to react with the polymer and hence was merely used as a thinner to allow easier coating on the support.

Prior to the coating operation, the support was cleaned with chloroform and allowed to dry in air.

The application of the precursor solution to the surface of the support was performed as follows. The precursor solution was applied with a paint brush to the outer surface of the support, taking care to ensure an even coating. Any excess solution was wiped off the outer surface of the support with laboratory gloves.

After the application of the first coat of the precursor solution, the coated tube was allowed to dry in air for a period of about 6–12 hours to allow complete evaporation of the acetone. After this drying step, the setup was placed on a glass boat in a quartz tubular reactor and the quartz reactor was then inserted into a Lindberg single zone furnace. The temperature in the furnace was controlled by using an OMEGA CN2401 temperature controller with a J-type thermocouple to monitor the temperature. The coating of the precursor solution on the outer surface of the support was then pyrolyzed by the following procedure. An inert gas (helium) was flowed through the quartz tubular reactor to prevent oxidation of the PFA coating during the pyrolysis. The temperature inside the furnace was then ramped at a rate of 10° C./min to the pyrolysis temperature (i.e., 500, 600 or 800° C.) and held at that temperature for a period of two hours to form the CMS layer. The temperature inside the furnace was then cooled down to ambient temperature with the inert gas still flowing through the reactor.

Figure 2:
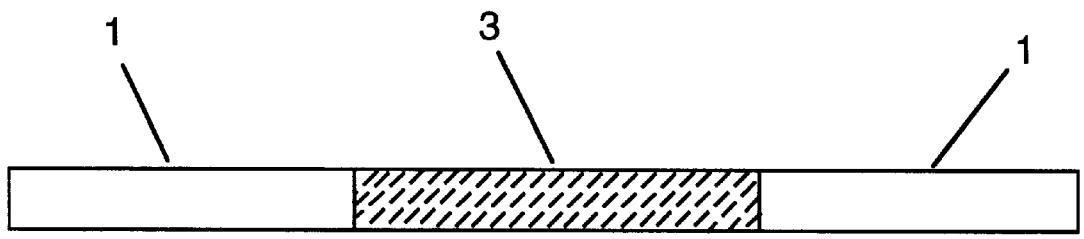
FIG. 2 shows the supported membrane formed in Example 1.

After cooling, the setup was removed from the furnace and the coating operation was carried out four more times to give a support that is covered with five coatings. The setup with a support having five coatings thereon constitutes the final supported membrane that is shown in FIG. 2, where the coated support is shown as 3.

The above procedure was performed on three setups. Although the steps of the procedure were the same for each setup, the pyrolysis temperature was changed. The first setup was held at 500° C. for two hours. The second setup was held at 600° C. for two hours and the third setup was held at 800° C. for two hours. Three different membranes were produced by these three procedures.

Production of Shell and Tube Modules

Figure 3:
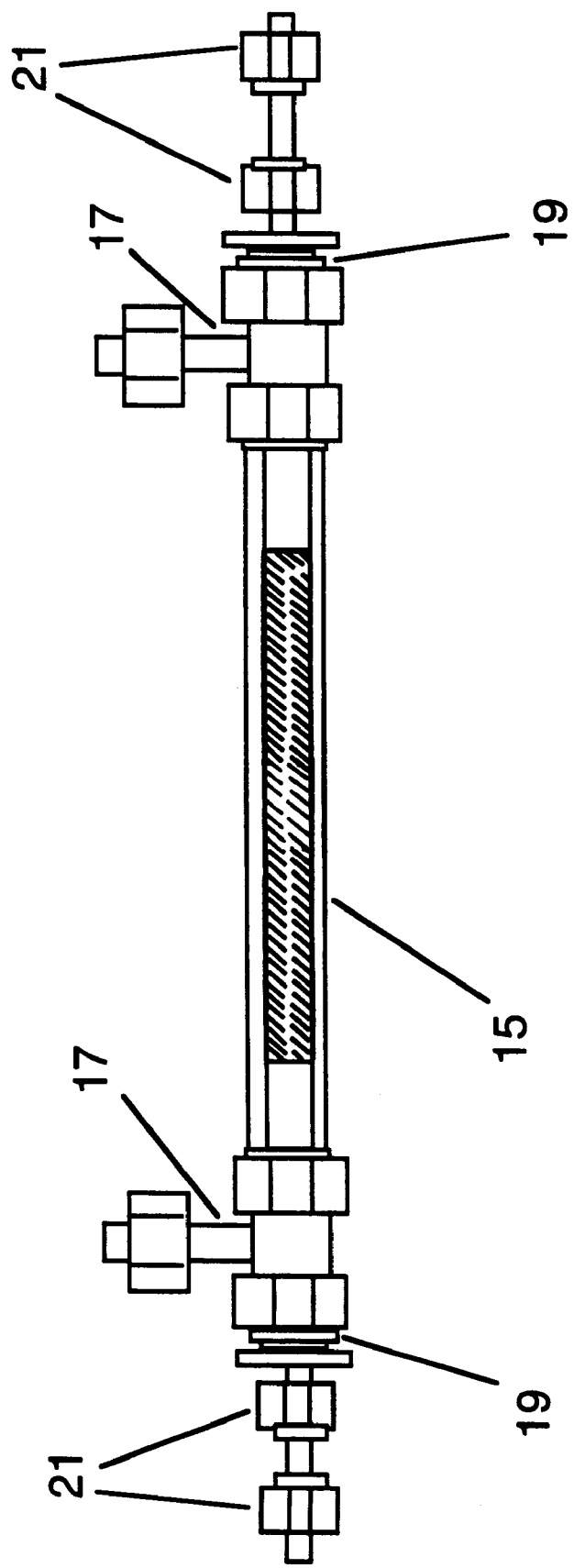
FIG. 3 shows the shell and tube module formed in Example 1.
Figure 4:
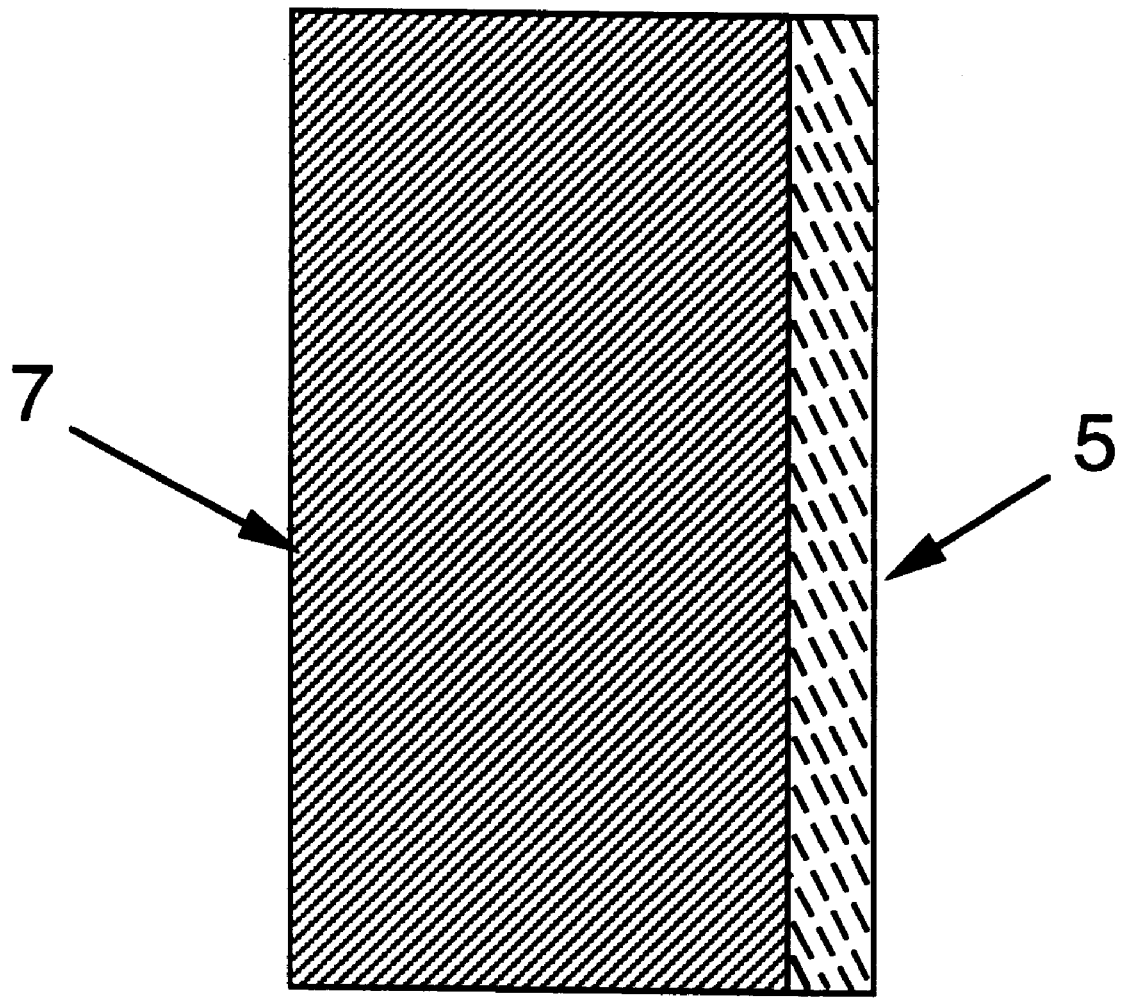
FIG. 4 is a cross-sectional view of a supported CMS membrane.

A shell and tube module is constructed by placing the supported tubular membrane in a stainless steel shell. A diagram of the completed module is shown in FIG. 3. The shell 15 was a stainless steel tube having an outer diameter of 0.5 inches, an inner diameter of 0.43 inches and a length of 11 inches. The ends of the shell are fitted with 0.5 inch stainless steel Swagelok™ Union Tees 17 which provide one port on the shell and tube side. A bored through Swagelok™ reducer 19 of 0.5 inch to 0.25 inch is fitted to the end of each of the tees and the tubular membrane is then slid into the shell. Two stainless steel nuts 21 with nylon ferrules are used to fasten the tube to the reducers (i.e., the non-coated ends of the tubular membrane were fastened to the stainless steel nuts with nylon ferrules). The module is thus made leak free and feed and outlet stream tubes and valves can be connected (i.e., there are two ports on both the shell and tube sides—see FIG. 3).

Testing Shell and Tube Modules—Unsteady State Permeability Test

Figure 5:
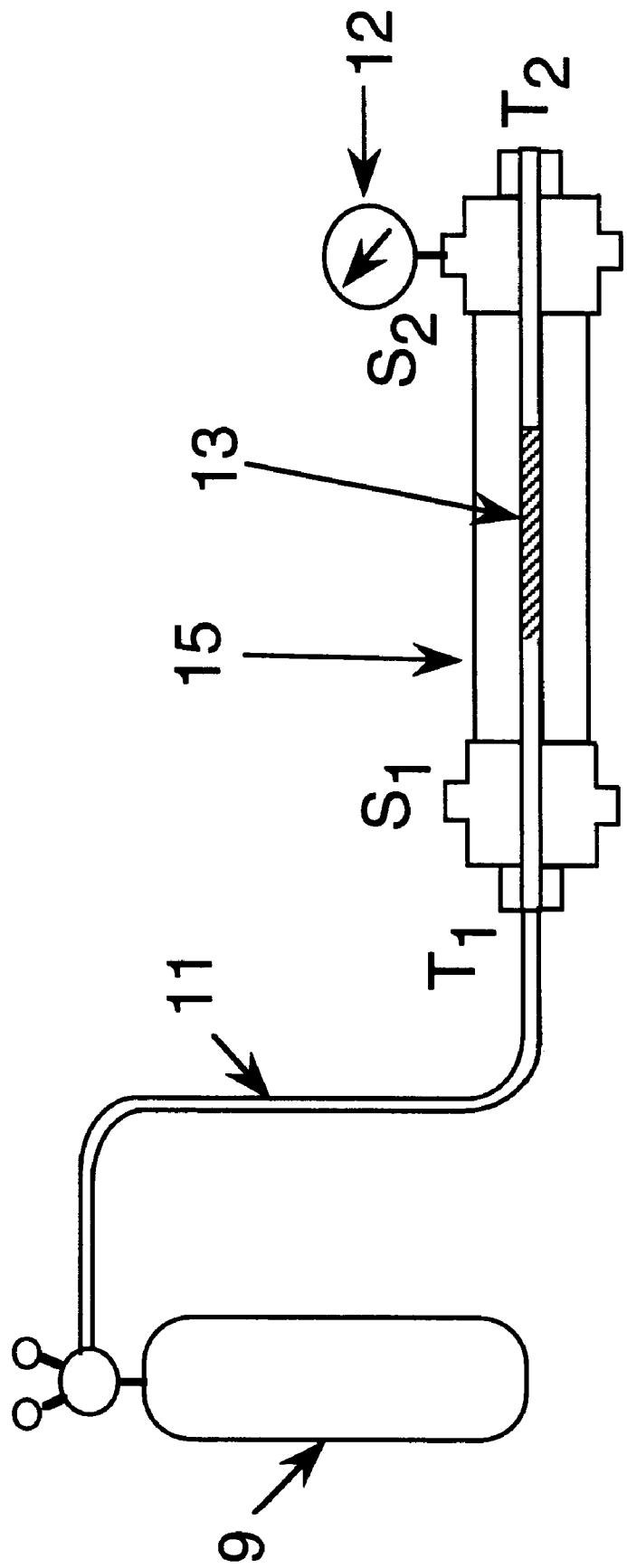
FIG. 5 is a schematic of an apparatus used to test the unsteady state permeability of the shell and tube membrane formed in Example 1.
Figure 7:
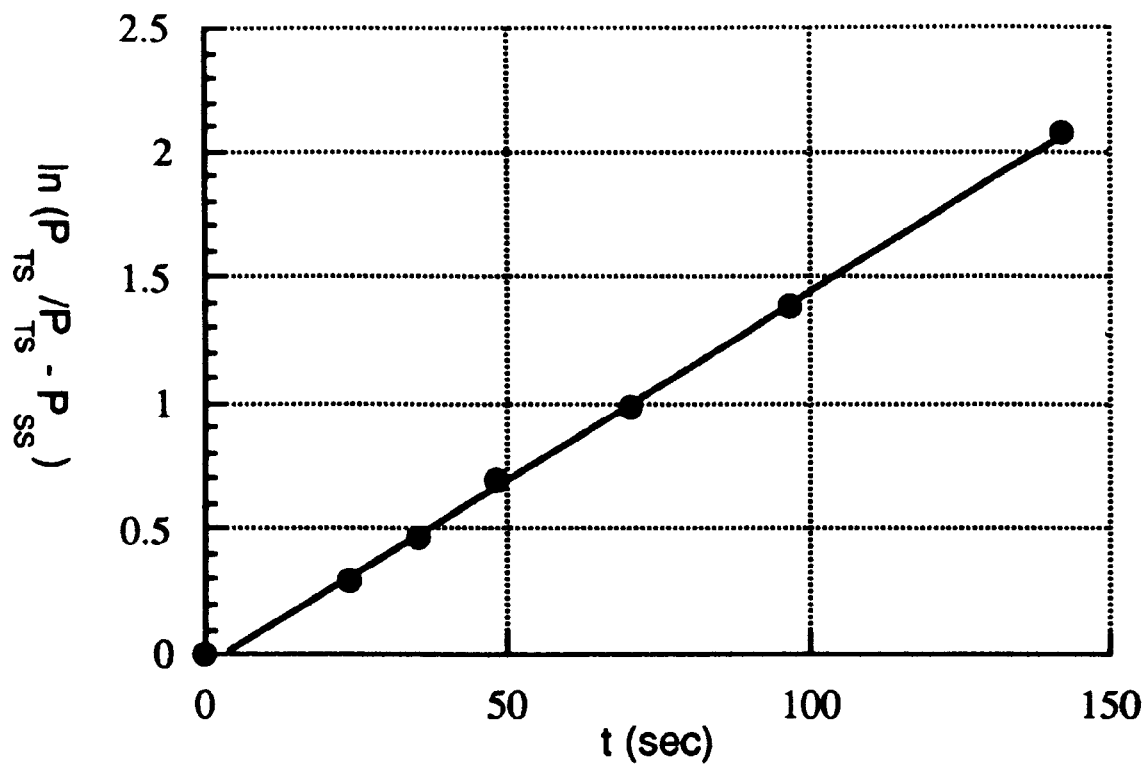
FIG. 7 is a plot which shows the permeability of the shell and tube module produced at 600° C. in Example 1.

The three supported tubular membranes formed in the first section of this Example were used to prepare three shell and tube modules as described above. Each module was then fitted on a stand and connected to feed and outlet stream tubes as shown in FIG. 5. Specifically, there are two ports on the shell side (denoted by $S_1$ and $S_2$) and the membrane 13 was fitted within the shell 15 to form a tube with two ports ($T_1$ and $T_2$). The inlet of the tube side $T_1$ was connected to a gas cylinder 9 by a length of stainless steel tubing 11 (¼ "outer diameter) and the outlet of the shell side $S_2$ was connected to a pressure gauge 12. $S_1$ and $T_2$ were sealed at all times. Several probe gases were then passed through each of the membranes over a range of pressures and temperatures to determine the permeability of different gases and their relative separation factors through the membranes. The gases were helium, methane, argon and sulfur hexafluoride, which have widely varying molecular weights. Argon and sulfur hexafluoride were known to adsorb onto the surface of carbon. For each gas, a constant static pressure of the gas was maintained on the tube side of the membrane and the rise in pressure was measured on the shell side of the membrane as a function of time. Data was collected for all of the probe gases and the permeabilities of the different molecules were regressed from the data (sample regression for the membrane formed at 600° C. and a tube side pressure $P_{TS}$=40 psig is shown in FIG. 7). The separation factor was defined as the ratio of permeabilities of two gases under the same experimental conditions. The tests were performed at ambient temperature and at tube side pressures ranging from 20 to 70 psig. Results for the various gases using the membrane formed at 600° C. are shown in FIG. 8. The permeability of helium alone through the different membrane samples is shown in FIG. 9. Separation factors as a function of tube side pressure are shown in FIG. 11. The dependence of permeability on temperature for the membrane produced at 600° C. is shown in FIG. 12.

Testing Shell and Tube Modules—Steady State Permeability Test

Figure 6:
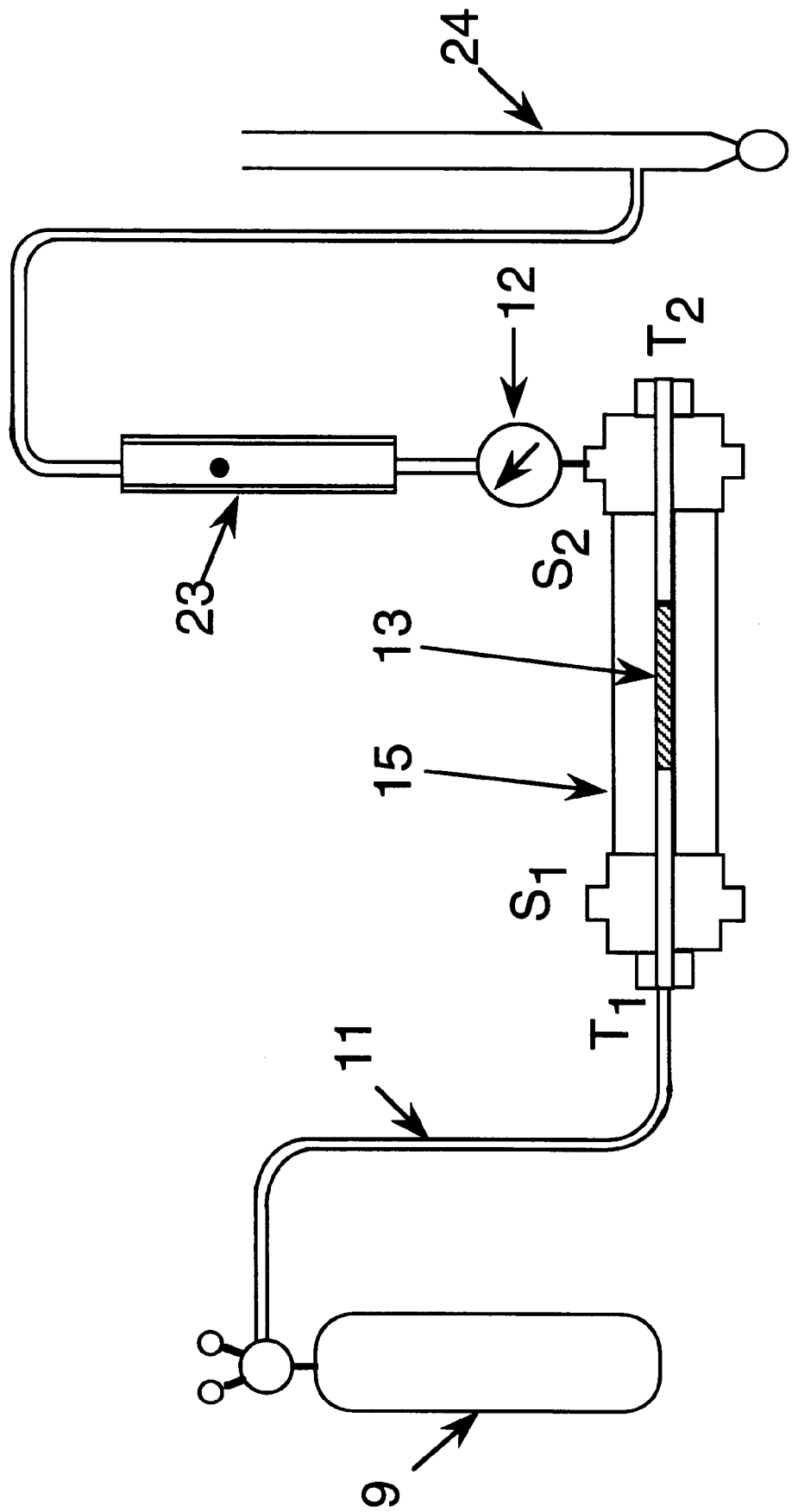
FIG. 6 is a schematic of an apparatus used to test the steady state permeability of the shell and tube membrane formed in Example 1.

The modules used were the same as in the unsteady state tests except that the outlet of the shell side $S_2$ was sent through a rotameter 23 and a bubble flowmeter 24 to measure the flowrate as a function of the pressure difference existing across the membrane under steady state conditions (see FIG. 6). A pressure head of gas was created on the tube side of the membrane and the rotameter on the shell side was used to vary the pressure drop. A plot of flowrate vs. pressure drop was used to determine a "volumetric permeability" of gas through the membrane.

The aim of this experiment was to identify the nature of the flow regime in the membrane based on variation in permeability with average pressure across the membrane. The Warburg-Knudsen equation was used to determine whether the permeability varied for the same pressure drop but different total pressures on either side of the membrane. It was found that there was an increase in the permeability with average pressure across the membrane, which was considerably larger for lighter molecules such as helium and methane (FIG. 10). This implied convective flow of gases through cracks in the membrane of the size 100 Å or more.

Testing Shell and Tube Modules—Temperature Dependent Permeability Experiments

The modules used were the same as in the unsteady state tests except that a J-type thermocouple was inserted into the tube of the module to measure the temperature at the center of the membrane. The shell was wrapped in heating tape and then in insulating tape to maintain isothermal conditions. The temperature of the system was controlled by connecting the heating tape to a variac (i.e., a transformer which is used to control the temperature of the heating tape by varying the amount of current supplied to the heating tape).

The unsteady state test method (described above) was used to analyze the permeability of gases under high temperature conditions. It was found that the permeability of all gases decreased with temperature. This decrease was more pronounced for heavier molecules such as $SF_6$ and argon (see FIG. 12). This again suggests convective flow through the membranes.

Example 2

Production of Disk Membranes

In order to characterize the membranes more easily, flat stainless steel disks were used as the support material for the CMS membrane. The disks had a diameter of 1.875 inches, a thickness of 0.039 inches and a pore size of 0.2 micron (Mott Metallurgical Corp., Mott Catalog Number 11005-1.875-0.039-0.2). The coating procedure was similar to that of the tubular membranes. The furfuryl alcohol/acetone solution was applied by hand brushing and the surface excess was wiped off with a rubber laboratory glove. The disks were weighed before and after coating and then once again after pyrolysis. It was observed that pyrolysis led to a loss of around 65–70 wt % of the fresh coat, thus resulting in a 30–35 wt % yield of carbon molecular sieve on the support. Two disk supported membranes were produced, one with five coatings produced at a pyrolysis temperature of 600° C. and one with 3 coatings produced at a pyrolysis temperature of 800° C.

Production of Disk Membrane Modules

Figure 16:
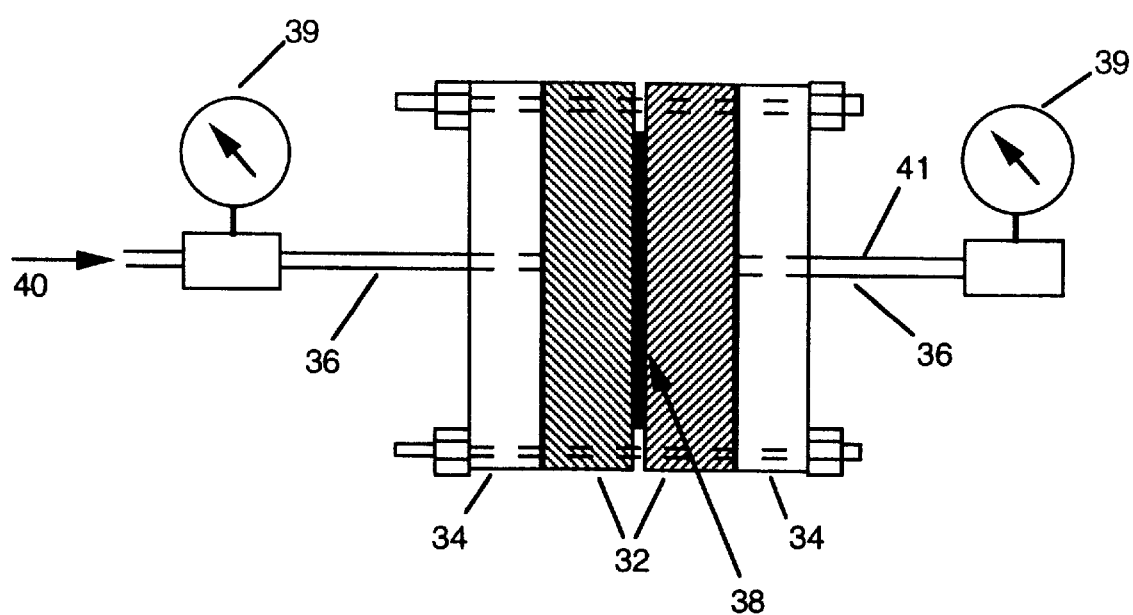
FIG. 16 is a substrate of the disk membrane module formed in Example 2.

As shown in FIG. 16, The disk membranes were formed into leak free modules by using two double sided flanges 32(MDC P/N 275150D; MDC Vacuum Products Corp., Hayward, Calif.). The knife edge on one side of each flange was machined off to allow a viton gasket (MDC P/N 191005; MDC Vacuum Products Corp., Hayward, Calif.) to be placed between each side of the disk 38 and the side of each flange that faced the disk. The disk-supported membrane was then sealed between the two viton gaskets. An inlet 40 and outlet 41 for the module was also provided by sealing (with copper gaskets) and outer flange 34 with tubing 36 on either side of the double sided flanges. The tubing was ¼ inch outer diameter stainless steel and was welded to the center of each of the outer flanges.

Testing the Disk Membrane Modules—Unsteady State Permeability Test

Figure 17:
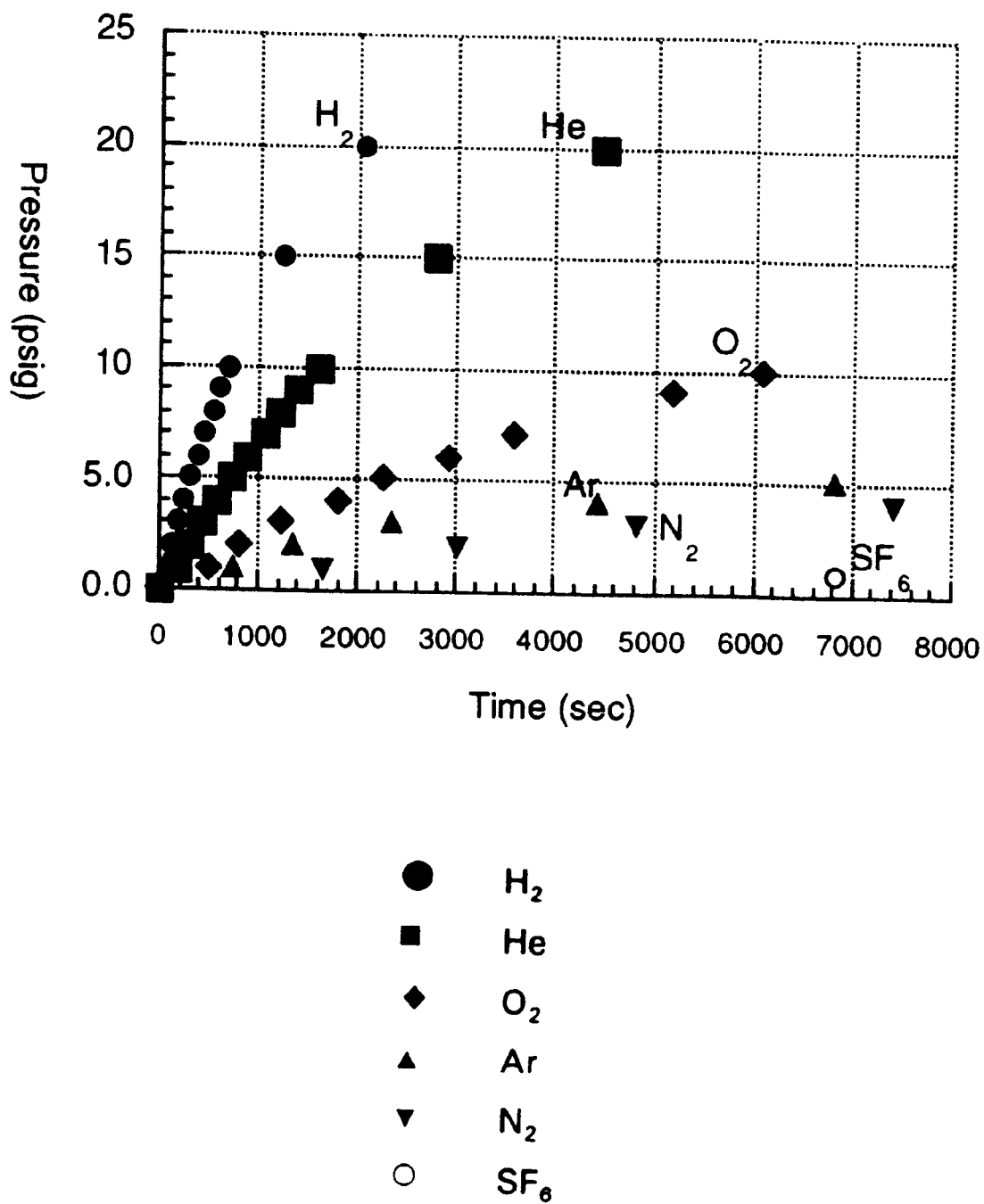
FIG. 17 is a plot of pressure vs. time for various gases at 293 K using the disk membrane module formed at 600° C. in Example 2.
Figure 18:
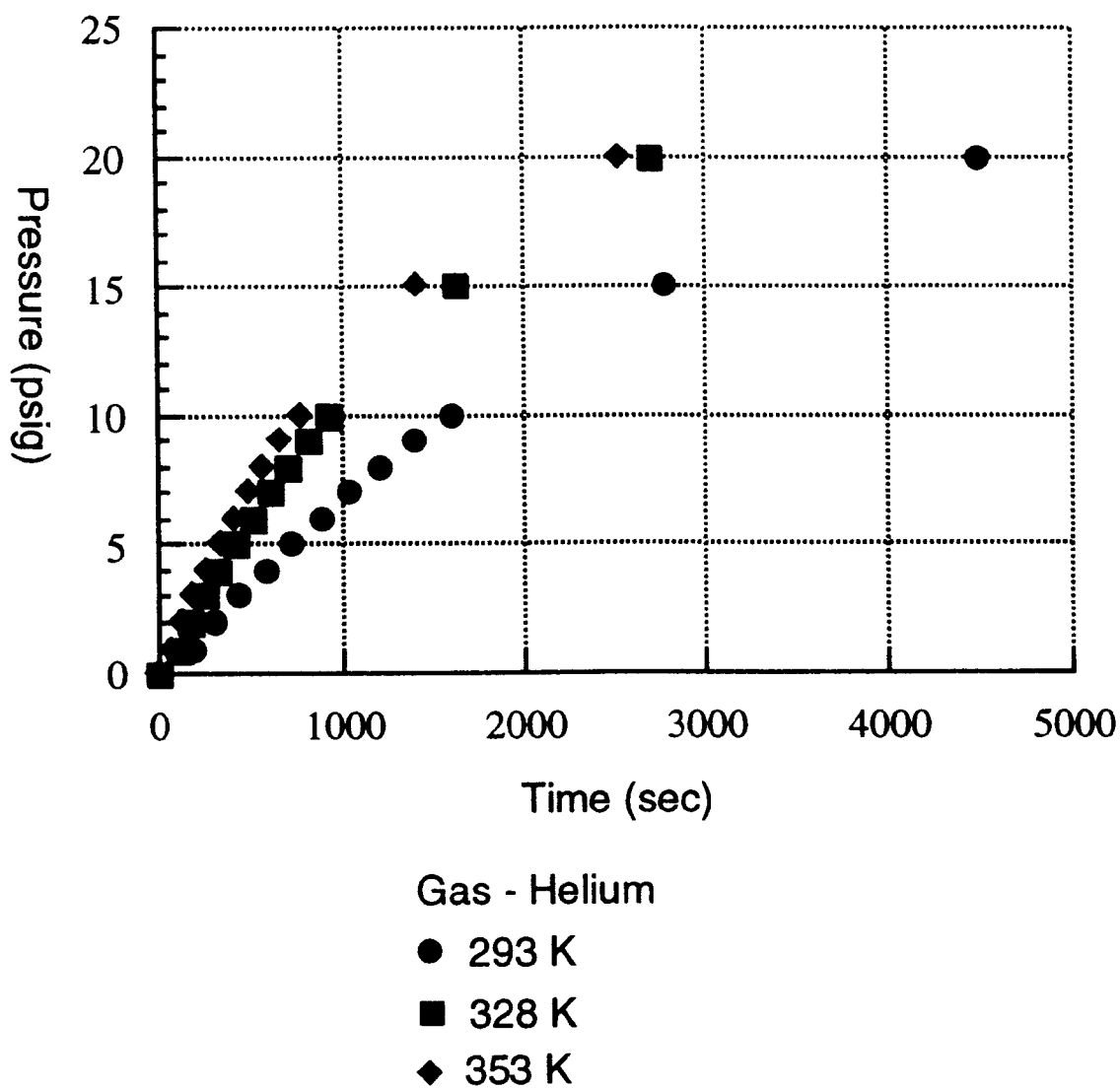
FIG. 18 is a plot of pressure vs. time for helium at various temperatures using the disk membrane module formed at 600° C. in Example 2.
Figure 19:
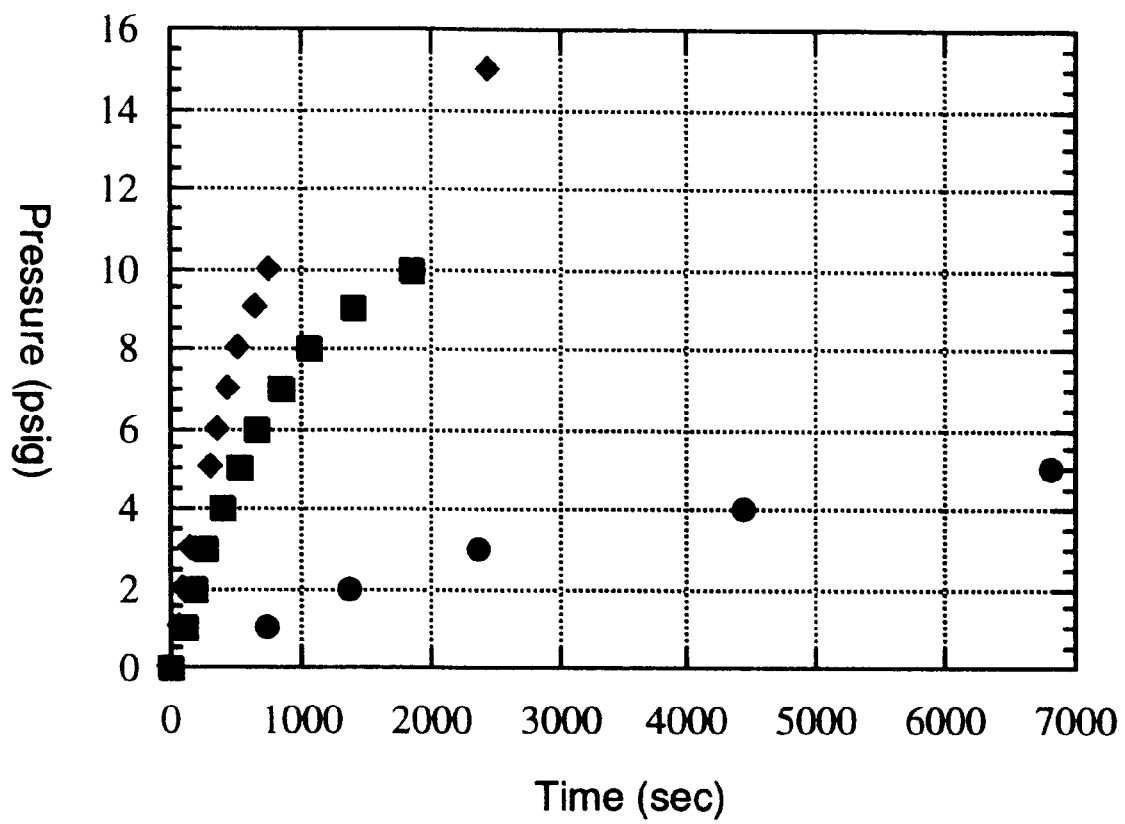
FIG. 19 is a plot of pressure vs. time for argon at various temperatures using the disk membrane module formed at 600° C. in Example 2.
Figure 20:
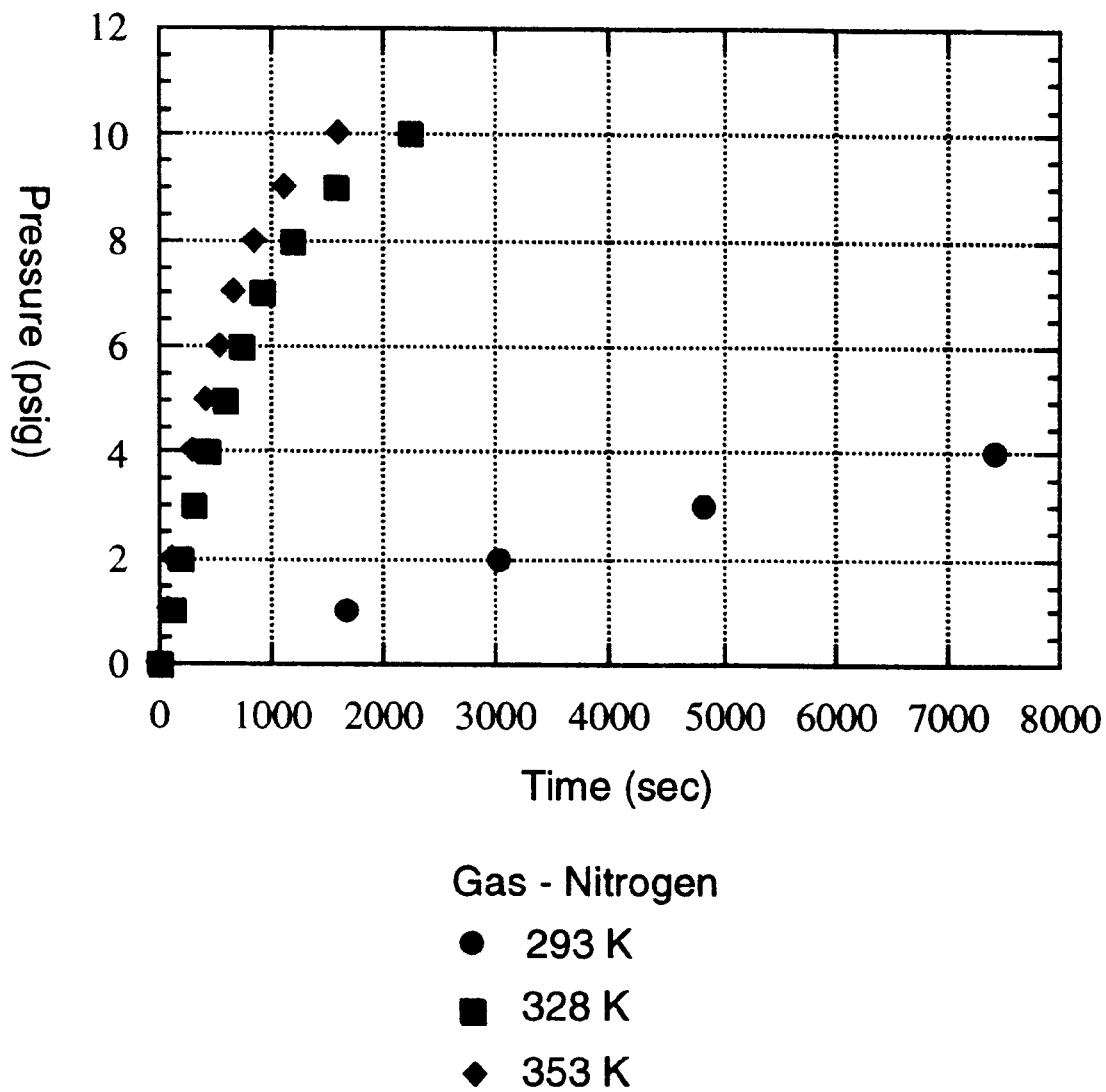
FIG. 20 is a plot of pressure vs. time for nitrogen at various temperatures using the disk membrane module formed at 600° C. in Example 2.
Figure 21:
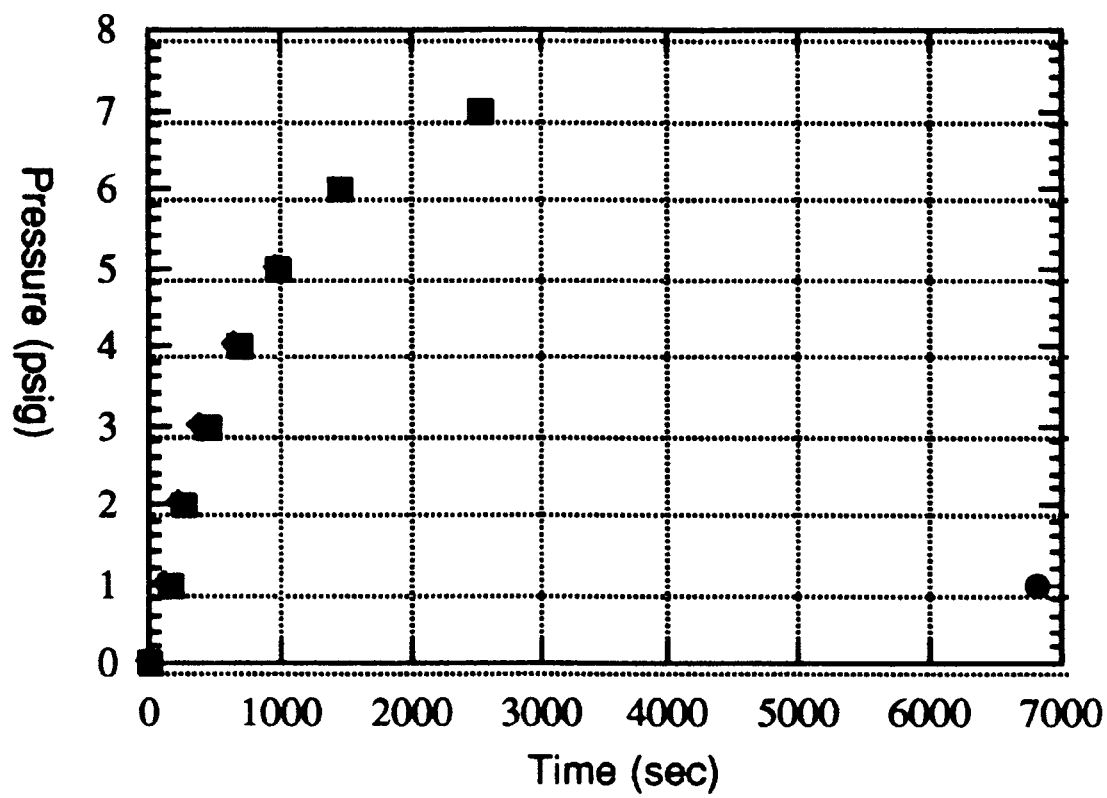
FIG. 21 is a plot of pressure vs. time for $SF_6$ at various temperatures using the disk membrane module formed at 600° C. in Example 2.

A rise time test experiment was performed on the disk supported membrane that was pyrolyzed at 600° C. (5 coats, 2 hr. soak time). A pressure gauge 39 was placed on the inlet and outlet tubes and the outlet tube was plugged. A valve was placed upstream of the inlet port to control the pressure in the module. Gas was flowed into the inlet port of the module and the pressure at the outlet port was monitored as a function of time. The results for various gases at 293K is shown in FIG. 17. The results indicate a high degree of molecular sieving. The permeabilities were regressed from the data and the separation factors obtained are shown in Table 1.

TABLE 1

|  | Separation Factor |
| --- | --- |
| Hydrogen | 1 |
| Helium | 2.2 |
| Oxygen | 7.8 |
| Argon | 11.9 |
| Nitrogen | 27 |
| $SF_6$ | 110 |

Testing the Disk Membrane Modules—Temperature Dependent Permeability Test

The modules were the same as described above for the unsteady state test except that the module was wrapped in heating tape and then insulating tape. Two J-type thermocouples were attached to the system—one on the external surface of the module and one passing through the inlet of the flange and contacting the membrane surface. The entire module was heated to a certain temperature using a variac. During the ramp-up to the testing temperature (which was up to 1 hour in duration), helium was flowed over the surface of the membrane to prevent oxidation of the CMS material. For the testing of the gases, the helium flow was shut off and the inlet side of the membrane was filled with the probe gas at 30 psig pressure. The pressure on the outlet side of the module was then measured as a function of time.

Figure 22:
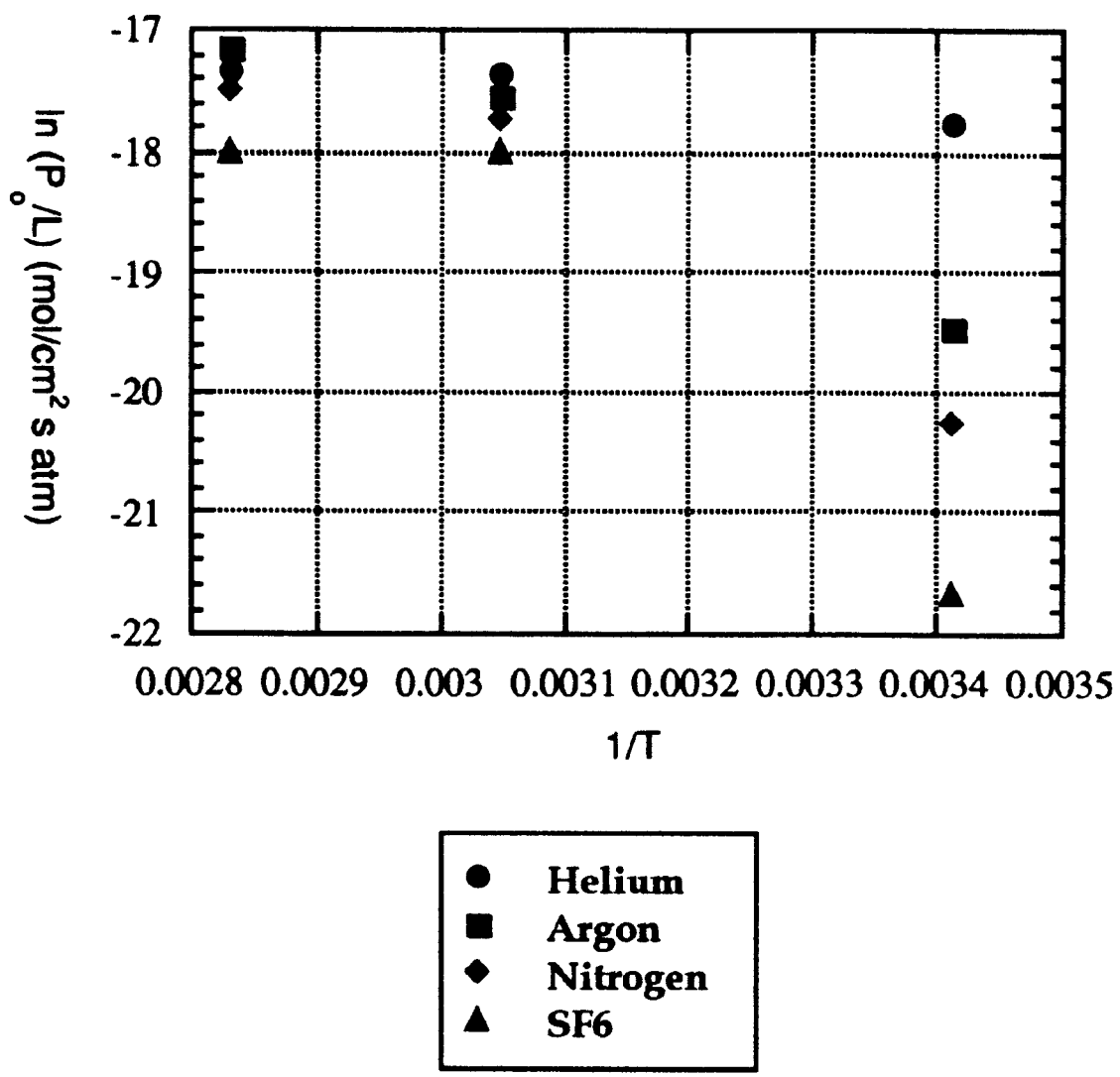
FIG. 22 is a plot of $\ln(P_o/L)$ vs. $1/T$ for various gases using the disk membrane module formed at 600° C. in Example 2.
Figure 23:
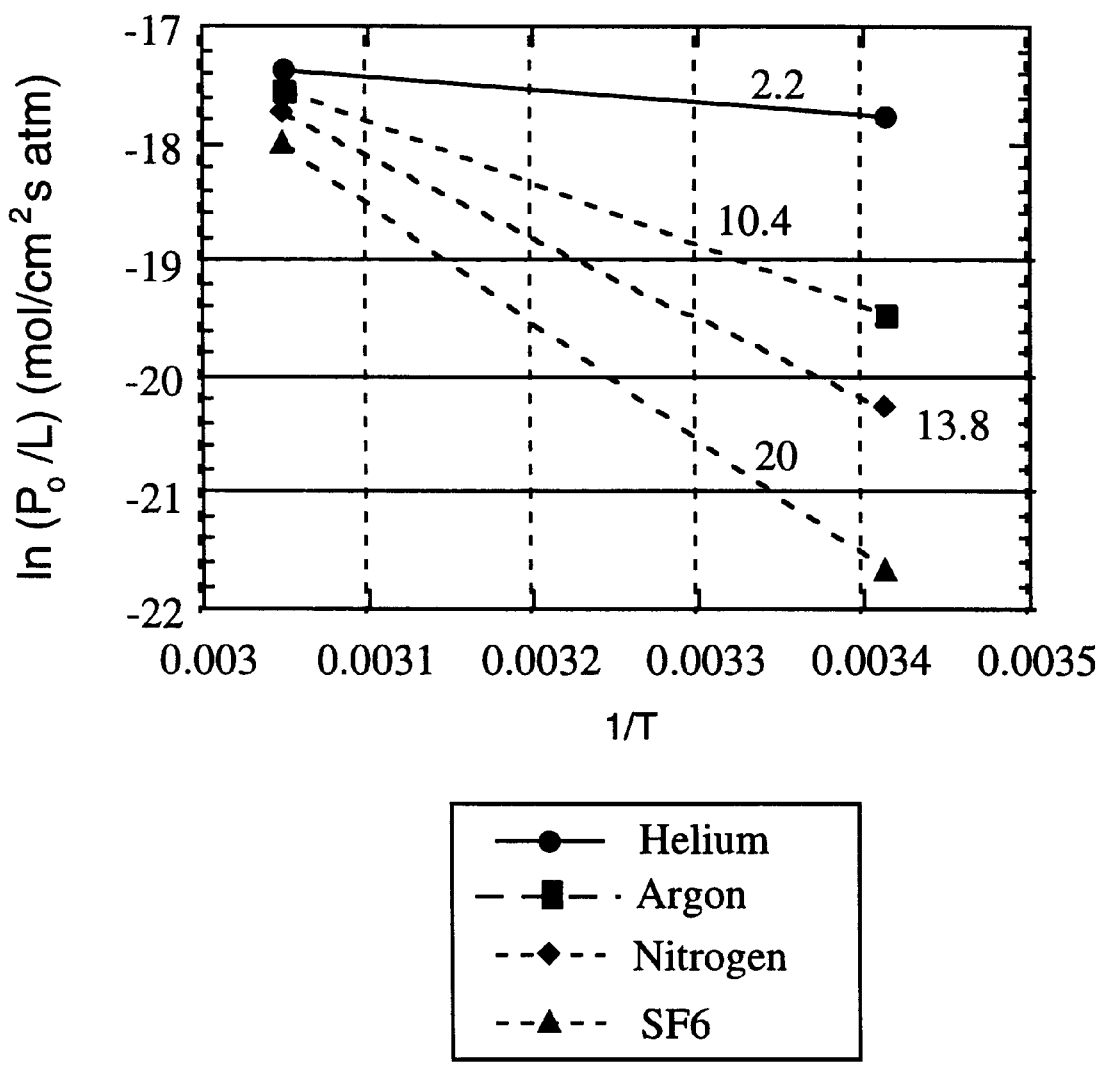
FIG. 23 is a plot of $\ln(P_o/L)$ vs. $1/T$ for various gases using the disk membrane module formed at 600° C. in Example 2.
Figure 24:
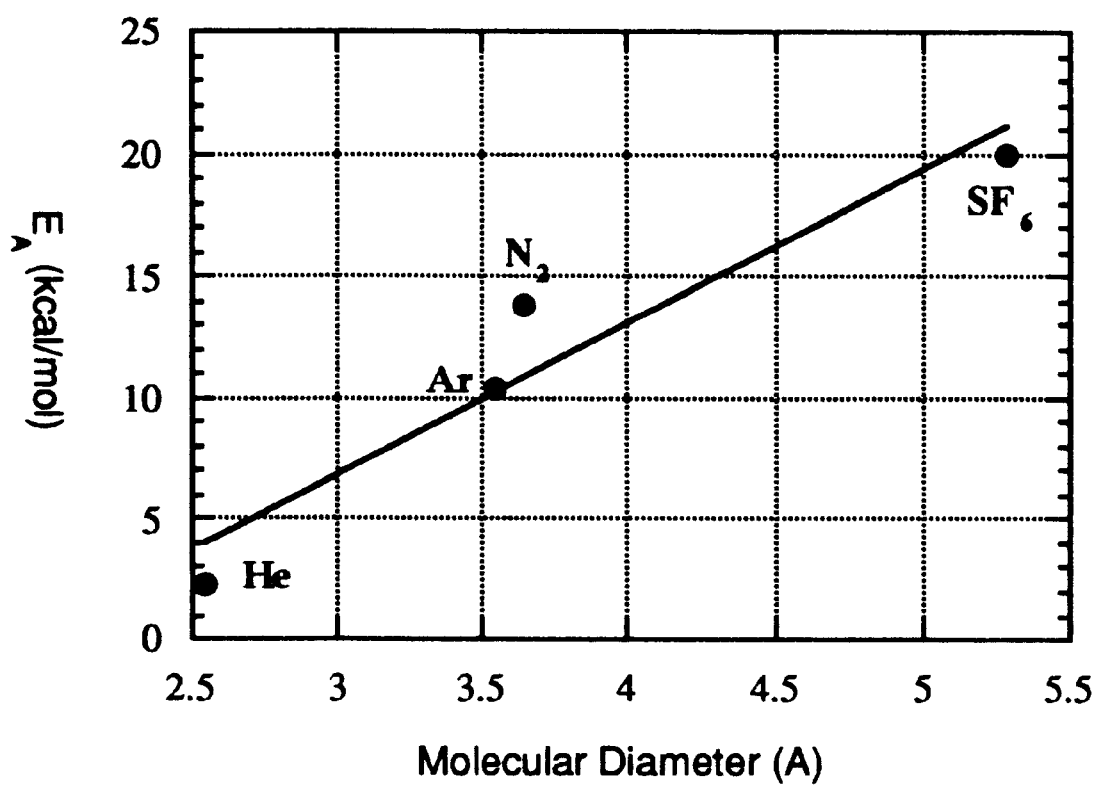
FIG. 24 is a plot of activation energy vs. molecular diameter for the gases listed in FIGS. 22 and 23.

The results for various gases are shown in FIGS. 18 through 21. The activation energies were regressed from FIGS. 22 and 23. The activation energy ($E_A$) as a function of molecular diameter is shown in FIG. 24 and conforms to the picture of micropores acting to restrict the entry of molecules into the micropores based on the size of the molecules.

EXAMPLE 3

Production of Disk Membrane

A disk-supported membrane was produced in the same manner as described in Example 2. The disk-supported membrane had 5 coatings of the furfuryl alcohol/acetone solution which were pyrolyzed at a temperature of 600° C.

Production of Disk Membrane Module

Figure 15:
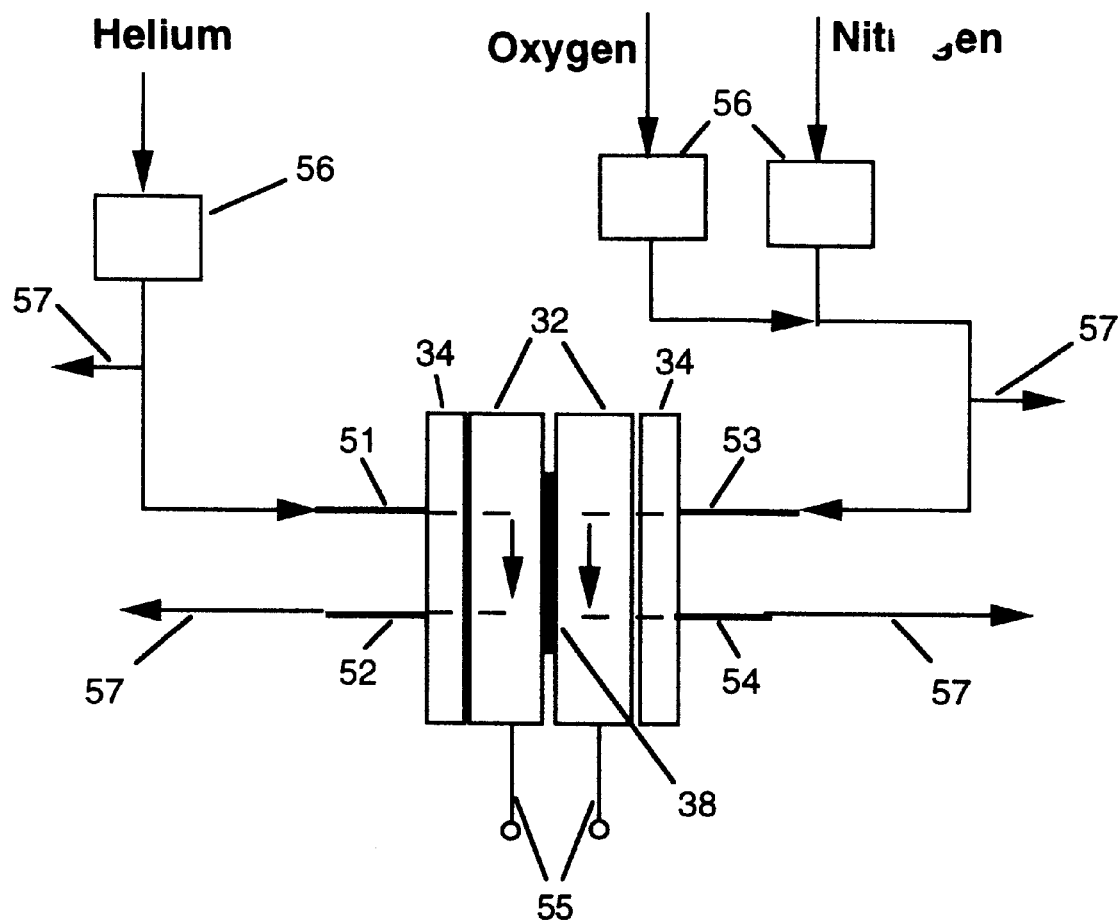
FIG. 15 is a schematic of a setup used to test the permeability of the disk membrane module formed in Example 3.

The module was produced in the same manner as in Example 2 except that the outer flanges were provided with both inlet and outlet ports so that gases could be flowed past each side of the membrane. A schematic of the setup is shown in FIG. 15 where the double sided flanges are shown as 32, the outer flanges are shown as 34, the disk-supported membrane is shown as 38, the downside inlet line is shown as 51, the downside outlet line is shown as 52, the topside inlet line is shown as 53 and the topside outlet line is shown as 54. The pressure on the topside and downside surfaces of the membrane were measured with pressure transducers 55. The downside inlet line 51 was connected to a mass flow controller 56 and an on-line gas chromatograph 57. The downside outlet line, the topside inlet line and the topside outlet line were also connected to the same on-line gas chromatograph 57. The gas chromatograph was a column packed with Molecular Sieve 45/60 (Supelco Inc., Bellefonte, Penn.) and was 5 meters long by ⅛" outer diameter. The load time for the gas chromatograph was 30 seconds. The gas chromatograph was calibrated to low concentrations of $O_2$ and $N_2$ in helium. Each of the gas stream lines was analyzed separately in the gas chromatograph after the previous gas had been purged from the chromatograph. Flowrates for each of the inlet and outlet lines were measured using bubble flowmeters (not shown in FIG. 15).

Testing the Module—Steady State Permeability of Binary Mixture of Oxygen and Nitrogen The experiments consisted of passing a mixture of oxygen and nitrogen at a constant flowrate (i.e., $N_2+O_2$ flowrate was about 0.57–0.58 cc/s) on the topside of the membrane and analyzing the composition of the permeate on the downside. A sweep of helium (helium flowrate was about 0.11–0.12 cc/s) was maintained and the pressure on the topside was varied from 2 to 6.2 atmospheres while the downside pressure was held constant at 1.06 atm.

The composition of the gas in the inlet line 53 of the topside was 46.5% oxygen and 53.5% nitrogen. The composition of the gas in the outlet line 52 of the downside was found to vary from 60 to 65% oxygen over the range of pressures used.

Figure 25:
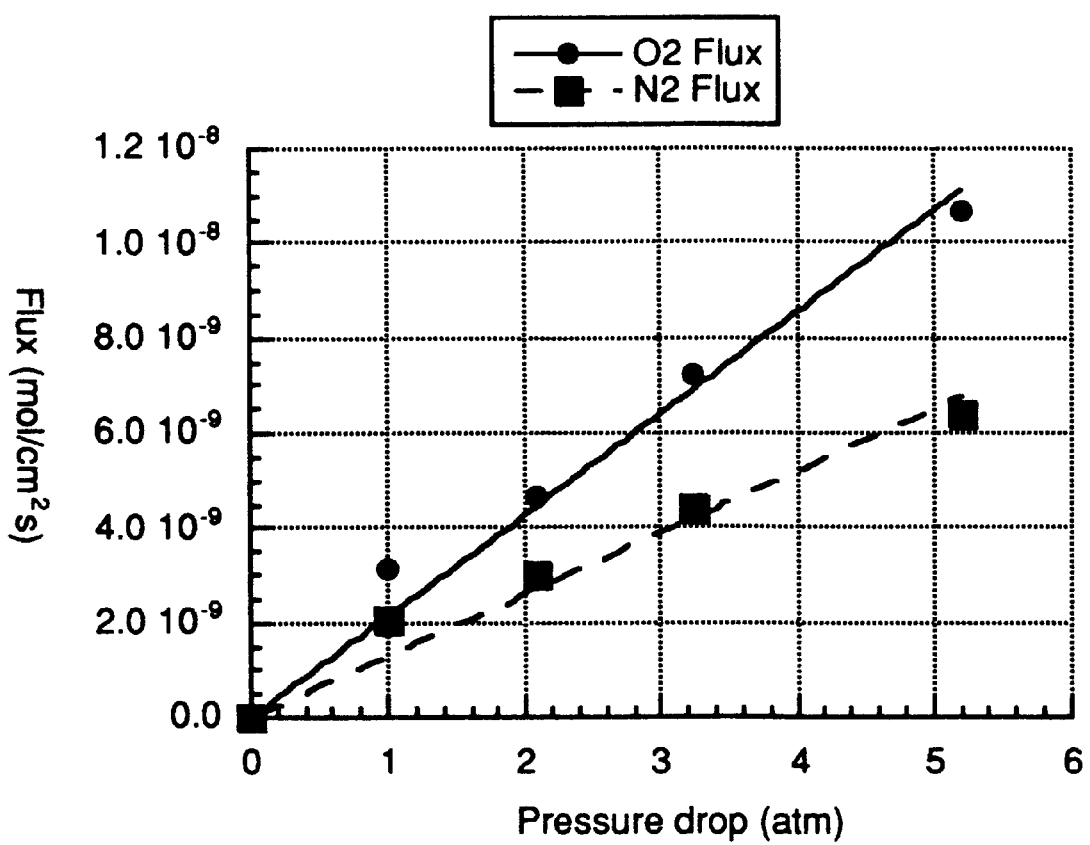
FIG. 25 is a plot of the molar flux of oxygen and nitrogen vs. the pressure drop using the disk membrane module formed in Example 3.

The molar flux of both oxygen and nitrogen was found to increase almost linearly with the pressure drop, as shown in FIG. 25. The flux was calculated from the following formula:

$J_i$ (mol/cm²s)=(flowrate in downside outlet line 52 in cc/s–measured at atmospheric pressure)·(mole fraction of i as analyzed by GC)·(concentration of air based on GC area)/RTA where i refers to oxygen or nitrogen, A=cross-sectional area of the membrane, $$R = 82.059 \; \frac{cm^3 atm}{mol \; K} \; \text{(proportionality constant)}$$

and T=temperature K.

The permeability of the gases was calculated using both CSTR (continuous stirred tank reactor) and PFR (plug flow reactor) assumptions. The average composition of the inlet and outlet streams was considered in the PFR case. Due to the very small change in composition, both assumptions gave nearly identical values for the permeability. The expression for permeability is:

$P_{mi}=J_i$(mol/cm²s)/(partial pressure driving force of $i$)

Figure 26:
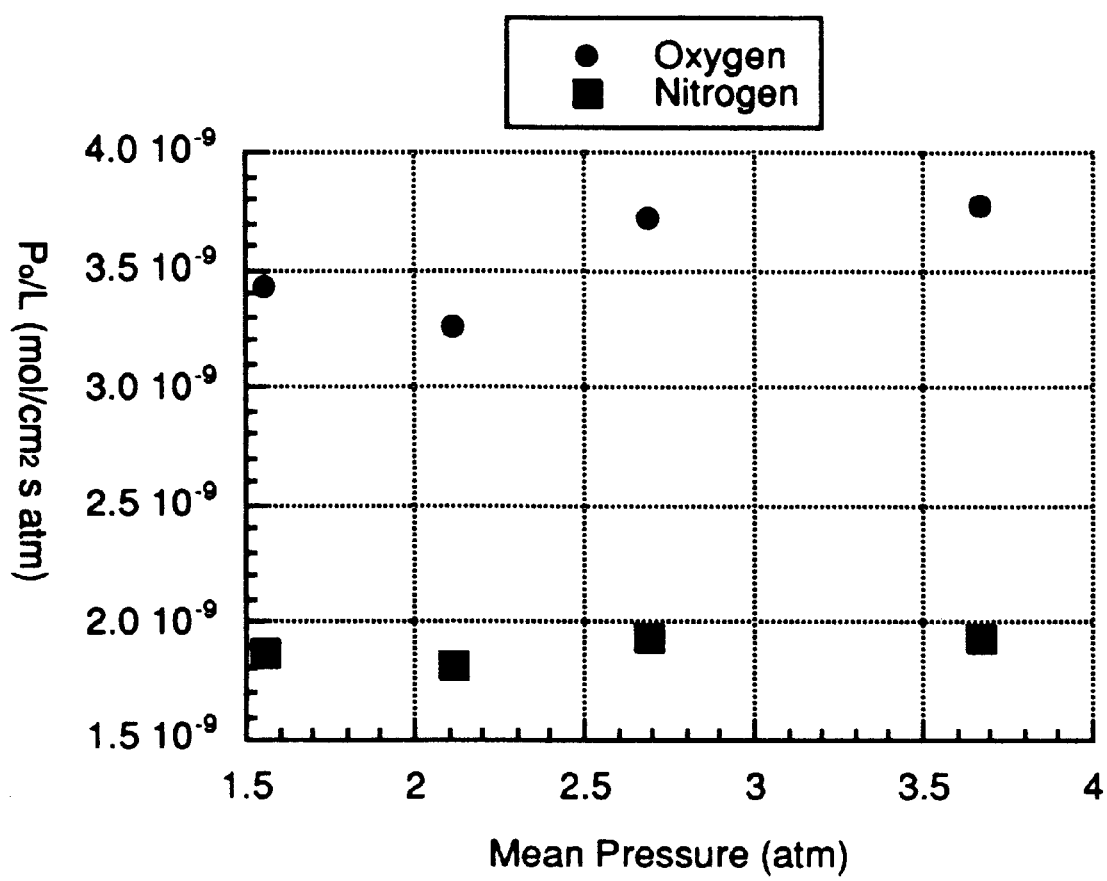
FIG. 26 is a plot of $P_o/L$ vs. mean pressure for oxygen and nitrogen using the disk membrane module formed in Example 3.

The permeability (mol/cm²s atm) was nearly constant over the pressure range used, as shown in FIG. 26. The runs were carried out for up to 12 hours and the compositions and flowrates were constant:. No fouling of the membrane, based on reduced separation factors, was observed.

A final experiment was performed in the absence of a helium sweep. The topside pressure was maintained at 6 atm and the flowrate on the topside of the membrane was very low (i.e., the flowrate was about 0.19 cc/s). The same composition mixture (i.e., 46.5% oxygen and 53.5% nitrogen) was fed on the topside and the downstream composition (i.e., in the outlet line 52 from the downside) was analyzed. Due to the very low flowrates, the GC load time was increased to 2 hours to obtain a meaningful analysis. The result is consistent with the experiments performed with a helium sweep. A composition of 61% oxygen was observed downstream after 22 hours.

The pressure independence of the permeabilities suggests that the membrane has very few cracks and is predominantly molecular sieving in nature. The separation factors are also independent of pressure, which is of considerable benefit, since fluxes increase at higher pressure drops.

The experiment performed in the absence of helium flow confirms that there is separation of oxygen and nitrogen and that the presence of a sweep gas does not interfere with the permeation.

The experiments described in this Example prove the effectiveness of the disk membrane in performing steady state separation of oxygen and nitrogen. The enhancement of oxygen the separation factors were constant at different pressures which is expected of a predominantly molecular sieving membrane. Despite the small difference in size of oxygen and nitrogen (0.2 Å), the membrane is able to block out nitrogen over a long period of time (up to 12 hours) thus indicating shape selective sieving.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A carbogenic molecular sieve device which comprises:
   a. a support having at least one pore;
   b. a membrane which is attached to a surface of the support and consists essentially of a carbogenic molecular sieve material having pores which have a smaller diameter than the diameter of the at least one pore of the support; wherein at least one of the pores of the membrane communicates with the at least one pore of the support.

2. The carbogenic molecular sieve device of claim 1, wherein said support has at least two pores that have diameters that are larger than the diameter of the pores of the membrane and each of said pores of the support communicate with at least one of the pores of the membrane.

3. The carbogenic molecular sieve device of claim 1, wherein said support consists essentially of metal.

4. The carbogenic molecular sieve device of claim 1, wherein said device is for separating at least one gas from a mixture of gases by predominantly molecular sieving action with little or none of the separation of the at least one gas from the mixture of gases being attributable to surface flow by selective adsorption.

5. The carbogenic molecular sieve device of claim 1, wherein said device is for separating at least one gas from a mixture of gases by predominantly molecular sieving action where the at least one gas that is separated from the mixture of gases passes through the membrane and has a molecular weight or kinetic diameter that is smaller than any of the gases in the mixture of gases that do not pass through the membrane.

6. A carbogenic molecular sieve device which comprises:
   a. a support consisting essentially of a body of metal having pores;
   b. a membrane which is attached to a surface of the support and consists essentially of a carbogenic molecular sieve material having pores which have a smaller diameter than the diameter of the pores of said support; wherein a portion of the pores of said membrane communicate with the pores of said support.

7. The carbogenic molecular sieve device of claim 6, wherein said device is for separating at least one gas from a mixture of gases by predominantly molecular sieving action with little or none of the separation of the at least one gas from the mixture of gases being attributable to surface flow by selective adsorption.

8. The carbogenic molecular sieve device of claim 6, wherein said device is for separating at least one gas from a mixture of gases by predominantly molecular sieving action where the at least one gas that is separated from the mixture of gases passes through the membrane and has a molecular weight or kinetic diameter that is smaller than any of the gases in the mixture of gases that do not pass through the membrane.

9. A carbogenic molecular sieve device for separating at least one gas from a mixture of gases which comprises:
   a. a support having at least one pore;
   b. a membrane which is attached to a surface of the support and consists essentially of a carbogenic molecular sieve material having pores which have a smaller diameter than the diameter of the at least one pore of the support; wherein at least one of the pores of the membrane communicates with the at least one pore of the support; and further wherein the membrane separates the at least one gas from the mixture of gases by molecular sieving action.

10. The carbogenic molecular sieve device of claim 9, wherein said support has at least two pores that have diameters that are larger than the diameter of the pores of the membrane and each of said pores of the support communicate with at least one of the pores of the membrane.

11. The carbogenic molecular sieve device of claim 9, wherein said support consists essentially of metal.

12. The carbogenic molecular sieve device of claim 9, wherein the mixture of gases comprises a plurality of gases with each gas having a molecular diameter or kinetic diameter; further wherein the at least one gas that is separated from the mixture of gases consists of a gas that has a molecular diameter or kinetic diameter that is smaller than any other gas in the mixture of gases.

13. The carbogenic molecular sieve device of claim 9, wherein the mixture of gases comprises a plurality of gases with each gas having a molecular diameter or kinetic diameter; further wherein the at least one gas that is separated from the mixture of gases consists of several different gases that have molecular diameters or kinetic diameters that are smaller than the molecular diameter or kinetic diameter of any gas that is not separated from the mixture of gases by the membrane.

14. The carbogenic molecular sieve device of claim 9, wherein the mixture of gases consists essentially of a first gas having a molecular diameter or kinetic diameter and a second gas having a molecular diameter or kinetic diameter, further wherein the molecular diameter or kinetic diameter of said first gas is smaller than the molecular diameter or kinetic diameter of said second gas and the at least one gas that is separated from the mixture of gases by the membrane is said first gas.

15. The carbogenic molecular sieve device of claim 9, wherein the mixture of gases consists essentially of a first gas having a molecular diameter or kinetic diameter, a second gas having a molecular diameter or kinetic diameter and a third gas having a molecular diameter or kinetic diameter; further wherein the molecular diameter or kinetic diameter of said first gas is smaller than the molecular diameters or kinetic diameters of said second and third gases and the at least one gas that is separated from the mixture of gases by the membrane is said first gas.

16. The carbogenic molecular sieve device of claim 9, wherein the mixture of gases consists essentially of a first gas having a molecular diameter or kinetic diameter, a second gas having a molecular diameter or kinetic diameter and a third gas having a molecular diameter or kinetic diameter; further wherein the molecular diameter or kinetic diameter of said third gas is larger than the molecular diameters or kinetic diameters of said first and second gases and the at least one gas that is separated from the mixture of gases by the membrane is said first and second gases.

17. The carbogenic molecular sieve device of claim 9, wherein little or none of the separation of the at least one gas from the mixture of gases is attributable to surface flow by selective adsorption.

18. The carbogenic molecular sieve device of claim 9, wherein the at least one gas that is separated from the mixture of gases passes through the membrane and has a molecular weight or kinetic diameter that is smaller than any of the gases in the mixture of gases that do not pass through the membrane.

19. The carbogenic molecular sieve device of claim 9, wherein the mixture of gases comprises a plurality of gases having different kinetic diameters, further wherein essentially all of the pores in the membrane are larger than the kinetic diameter of a first portion of the gases in the mixture of gases and smaller than the kinetic diameter of the remaining portion of the gases in the mixture of gases.

20. The carbogenic molecular sieve device of claim 19, wherein the at least one gas that is separated from the mixture of gases is part of the first portion of the gases in the mixture of gases.

* * * * *